US012651013B2

(12) United States Patent
Sharifi et al.

(10) Patent No.: US 12,651,013 B2
(45) Date of Patent: Jun. 9, 2026

(54) DOMAIN-SPECIFIC CONVERSATIONAL AUTOMATED ASSISTANT

(71) Applicant: Google LLC, Mountain View, CA (US)

(72) Inventors: Matthew Sharifi, Kilchberg (CH);
Maryam Karimzadehgan, Mountain View, CA (US); Lukas Zilka, Zurich (CH); Julian Odell, Kirkland, WA (US); Jesper Andersen, Portland, OR (US)

(73) Assignee: Google LLC, Mountain View, CA (US)

( * ) Notice: Subject to any disclaimer, the term of this patent is extended or adjusted under 35 U.S.C. 154(b) by 32 days.

(21) Appl. No.: 18/714,673

(22) PCT Filed: Jan. 7, 2022

(86) PCT No.: PCT/US2022/011639
§ 371 (c)(1),
(2) Date: May 30, 2024

(87) PCT Pub. No.: WO2023/132834
PCT Pub. Date: Jul. 13, 2023

(65) Prior Publication Data
US 2025/0028744 A1     Jan. 23, 2025

(51) Int. Cl.
*G06F 16/50* (2019.01)
*G06F 16/3329* (2025.01)
(Continued)

(52) U.S. Cl.
CPC ...... *G06F 16/3329* (2019.01); *G06F 16/3344* (2019.01); *G06F 40/40* (2020.01); *G06N 3/006* (2013.01); *G06N 20/00* (2019.01)

(58) Field of Classification Search
None
See application file for complete search history.

(56) References Cited

U.S. PATENT DOCUMENTS 11,003,865 B1 * 5/2021 Lee .......................... G06F 40/56

OTHER PUBLICATIONS

International Search Report and Written Opinion for Application No. PCT/US22/11639 dated Jul. 20, 2022 (14 pages).
(Continued)

*Primary Examiner* — Belix M Ortiz Ditren
(74) *Attorney, Agent, or Firm* — Gray Ice Higdon

(57) ABSTRACT

Systems and methods for generating a domain-specific conversational automated assistant. In some examples, a conversational language model is used to generate a target answer and a target action recommendation in response to each of a set of in-domain training questions. In some examples, the conversational language model is further used to generate follow-up questions to one or more of its generated target answers, and to then generate a target answer and target action recommendation to each generated follow-up question. In some examples, the processing system also generates a set of out-of-domain training examples including an out-of-domain question, a predetermined target answer, and a predetermined target action recommendation. The automated assistant may then be trained to predict the generated target answers and target action recommendations based on the associated training question or generated follow-up question, as well as any prior questions and answers in the conversation.

23 Claims, 24 Drawing Sheets

(51) Int. Cl.

| | |
|---|---|
| *G06F 16/334* | (2025.01) |
| *G06F 40/40* | (2020.01) |
| *G06N 3/006* | (2023.01) |
| *G06N 20/00* | (2019.01) |

(56) References Cited

OTHER PUBLICATIONS

Adiwardana , et al., "Towards a Human-like Open-Domain Chatbot", arXiv :2001.09977v1, 2020, pp. 1-38.

Adiwardana , et al., "Towards a Human-like Open-Domain Chatbot", arXiv :2001.09977v2, 2020, pp. 1-38.

Adiwardana , et al., "Towards a Human-like Open-Domain Chatbot", arXiv :2001.09977v3, 2020, pp. 1-38.

Guu, Kelvin , "REALM: Retrieval-Augmented Language Model Pre-Training", arXiv:2002.08909v1, 2020, pp. 1-12.

Hajjar, Alamira Jouman, "LaMDA: Google's Language Model ForDialogue Applications," from: https://research.aimultiple.com/lamda/, printed Dec. 15, 2021, pp. 1-10.

Mohan, Deepa , et al., "Knowledge distillation of multilingual BERT forWalmart's conversational AI assistant," https://medium. com/walmartglobaltech/knowledge-distillation-of-multilingual-bert-for-walmarts-conversational-ai-assistant-98ca7c2c3835, printed Dec. 14, 2021, pp. 1-9.

Romero, Alberto , "Google's LaMDA: The Next Generation of Chatbots," from: https://towardsdatascience.com/googles-lamda-the-next-generation-of-chatbots-62294be58426, printed Dec. 15, 2021, pp. 1-6.

Romero, Alberto , "Top 5 GPT-3 Successors You Should Know in 2021," from: https://towardsdatascience.com/top-5-gpt-3-successors-you-should-know-in-2021-42ffe94cbbf, printed Dec. 15, 2021, pp. 1-8.

Sun, Siqi , et al., "Patient Knowledge Distillation for BERT Model Compression," arXiv:1908.09355v1, 2019, pp. 1-10.

Tahami, Amir Vakili, et al., "Distilling Knowledge for Fast Retrieval-based Chat-bots," arXiv:2004.11045v1, 2020, pp. 1-5.

Tian, James Yi , et al., "WaLDORf: Wasteless Language-model Distillation On Reading-comprehension," arXiv:1912.06638v1, 2019, pp. 1-13.

Tian, James Yi , et al., "WaLDORf: Wasteless Language-model Distillation On Reading-comprehension," arXiv:1912.06638v2, 2020, pp. 1-13.

European Patent Office, Summons issued in Application No. 22702819. 8, 13 pages, dated Nov. 24, 2025.

* cited by examiner

100

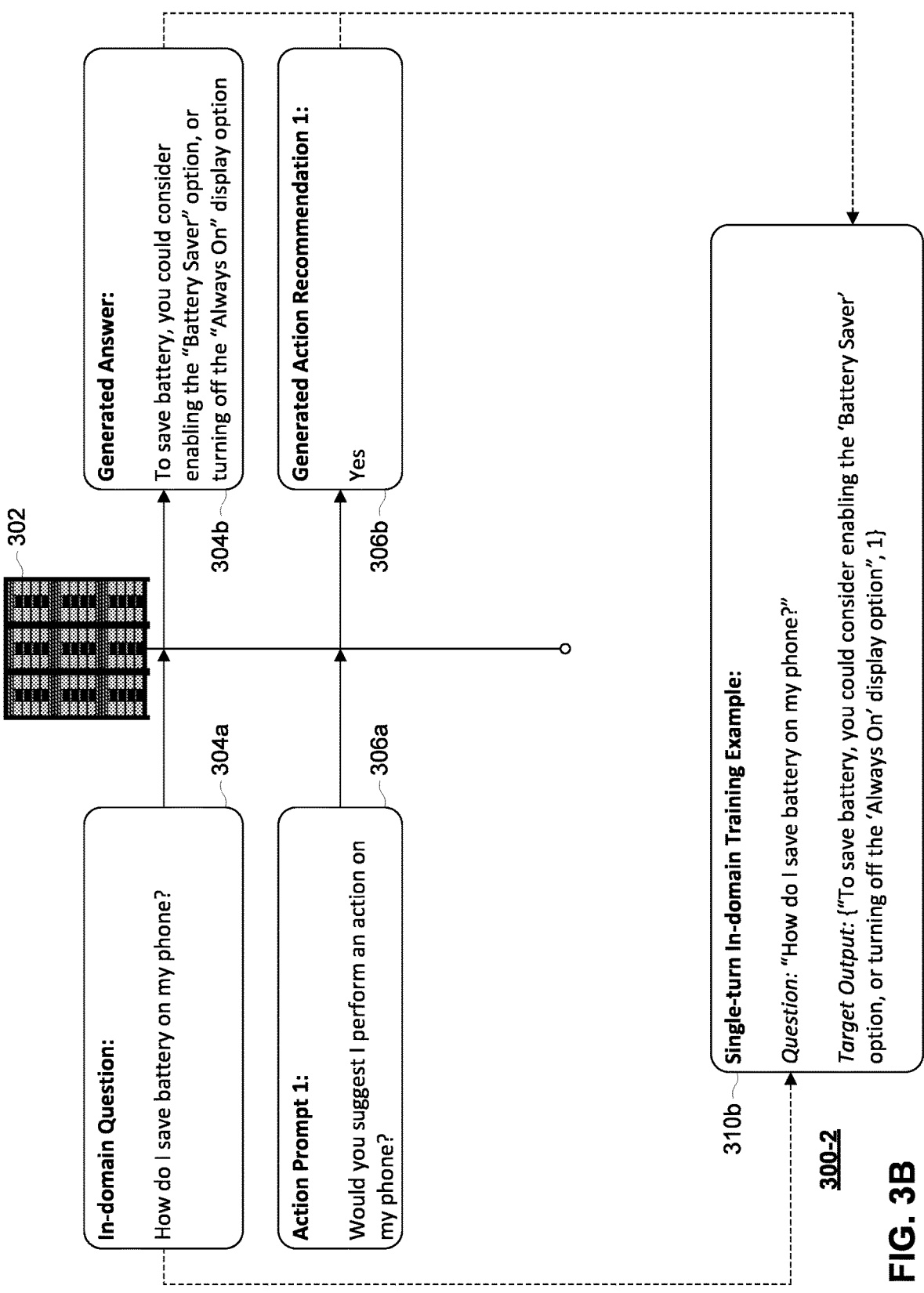

In-domain Question:

How do I save battery on my phone?

304a

302

Generated Answer:

To save battery, you could consider enabling the "Battery Saver" option, or turning off the "Always On" display option 304b

Action Prompt 1:

Would you suggest I perform an action on my phone?

306a

Generated Action Recommendation 1:

Yes

306b

Single-turn In-domain Training Example:

*Question:* "How do I save battery on my phone?"

*Target Output:* {"To save battery, you could consider enabling the 'Battery Saver' option, or turning off the 'Always On' display option", 1}

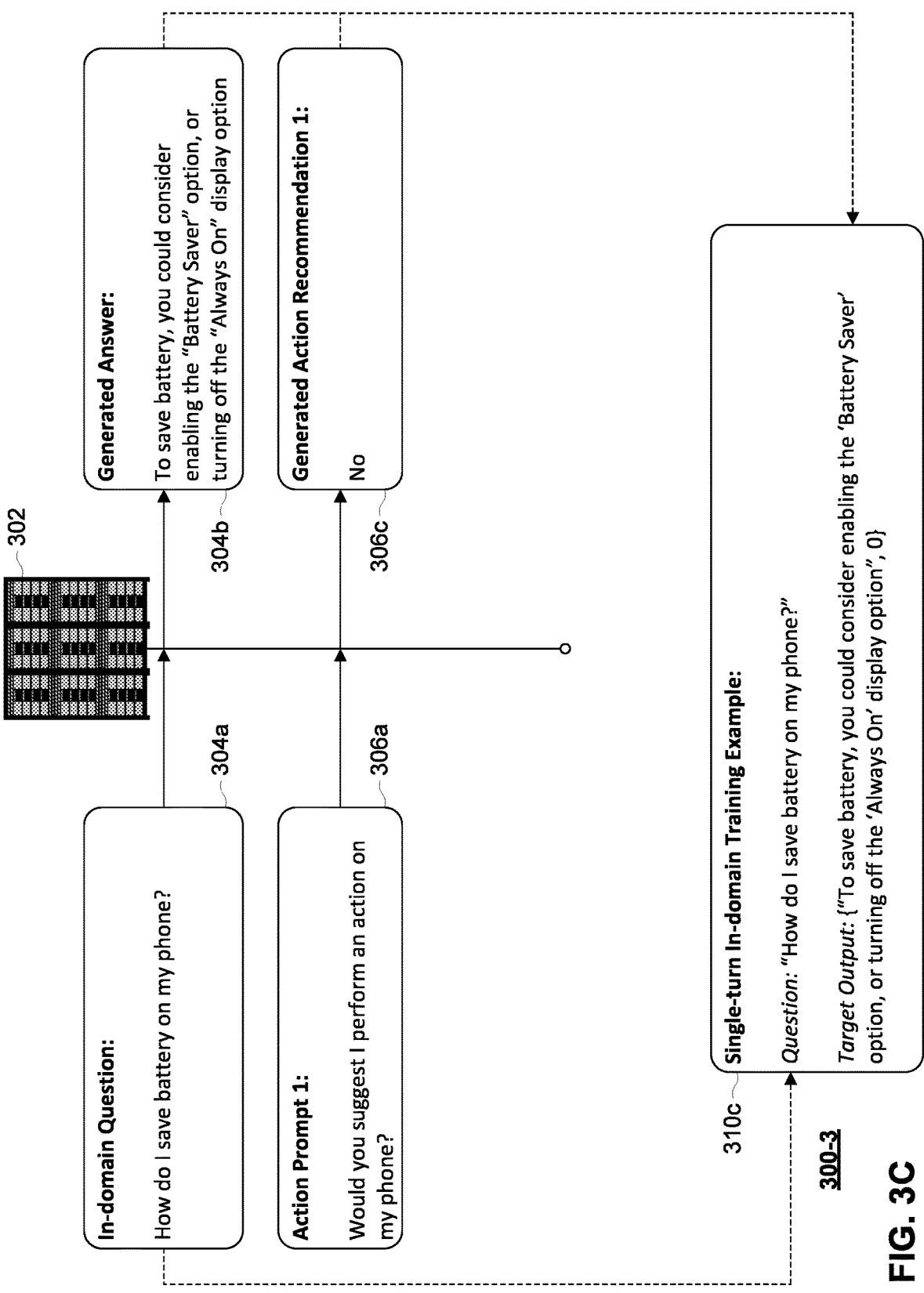

In-domain Question:

How do I save battery on my phone?

304a

302

Generated Answer:

To save battery, you could consider enabling the "Battery Saver" option, or turning off the "Always On" display option 304b

Action Prompt 1:

Would you suggest I perform an action on my phone?

306a

Generated Action Recommendation 1:

No

306c

Single-turn In-domain Training Example:

*Question:* "How do I save battery on my phone?"

*Target Output:* {"To save battery, you could consider enabling the 'Battery Saver' option, or turning off the 'Always On' display option", 0}

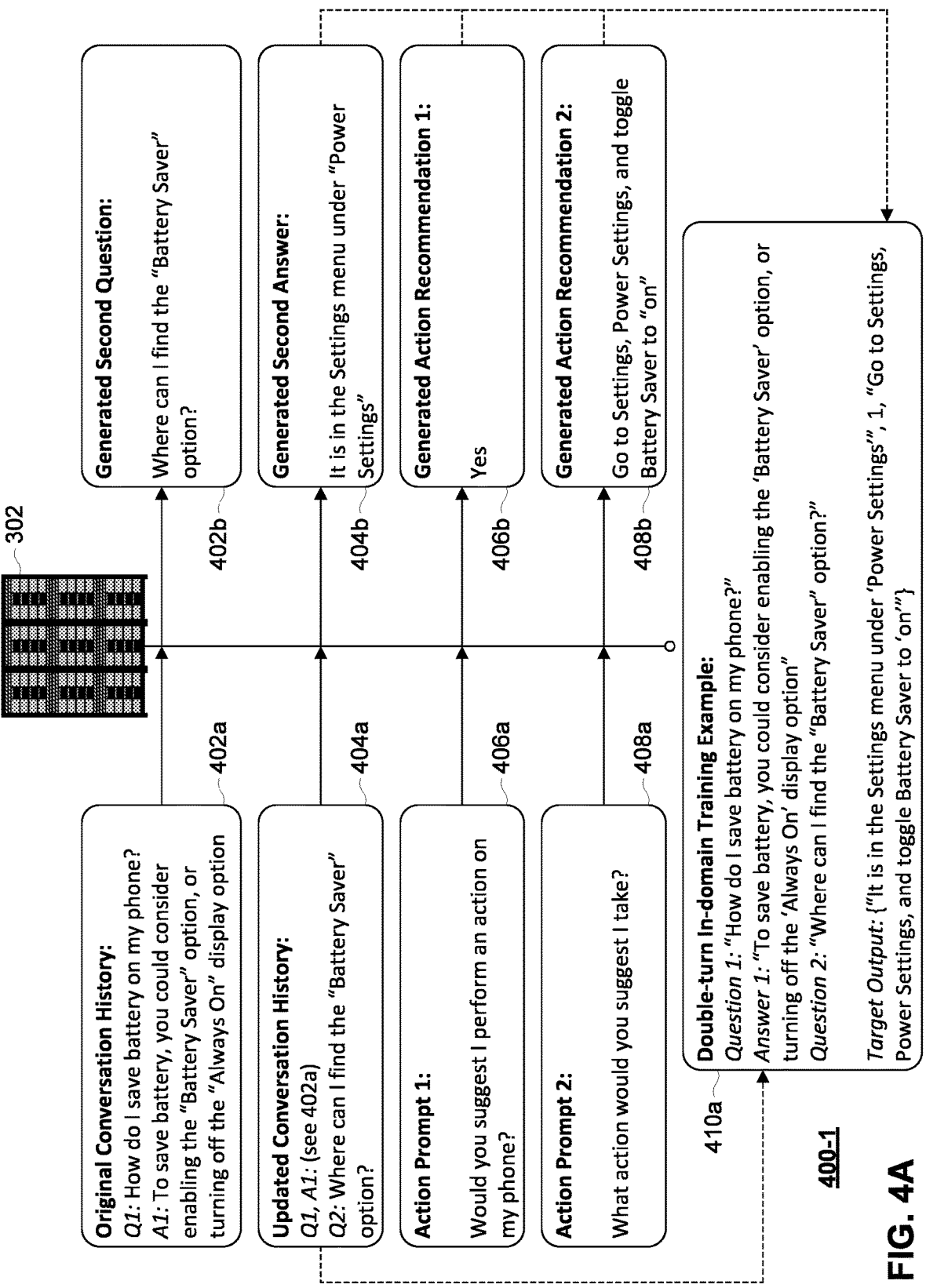

302

Original Conversation History:

*Q1:* How do I save battery on my phone?
*A1:* To save battery, you could consider enabling the "Battery Saver" option, or turning off the "Always On" display option 402a

Updated Conversation History:

*Q1, A1:* (see 402a)
*Q2:* Where can I find the "Battery Saver" option?

404a

Action Prompt 1:

Would you suggest I perform an action on my phone?

406a

Action Prompt 2:

What action would you suggest I take?

408a

Generated Second Question:

Where can I find the "Battery Saver" option?

402b

Generated Second Answer:

It is in the Settings menu under "Power Settings"

404b

Generated Action Recommendation 1:

Yes

406b

Generated Action Recommendation 2:

Go to Settings, Power Settings, and toggle Battery Saver to "on"

408b

Double-turn In-domain Training Example:

*Question 1:* "How do I save battery on my phone?"
*Answer 1:* "To save battery, you could consider enabling the 'Battery Saver' option, or turning off the 'Always On' display option"
*Question 2:* "Where can I find the "Battery Saver" option?"

*Target Output:* {"It is in the Settings menu under 'Power Settings'" , 1, "Go to Settings, Power Settings, and toggle Battery Saver to 'on'"}

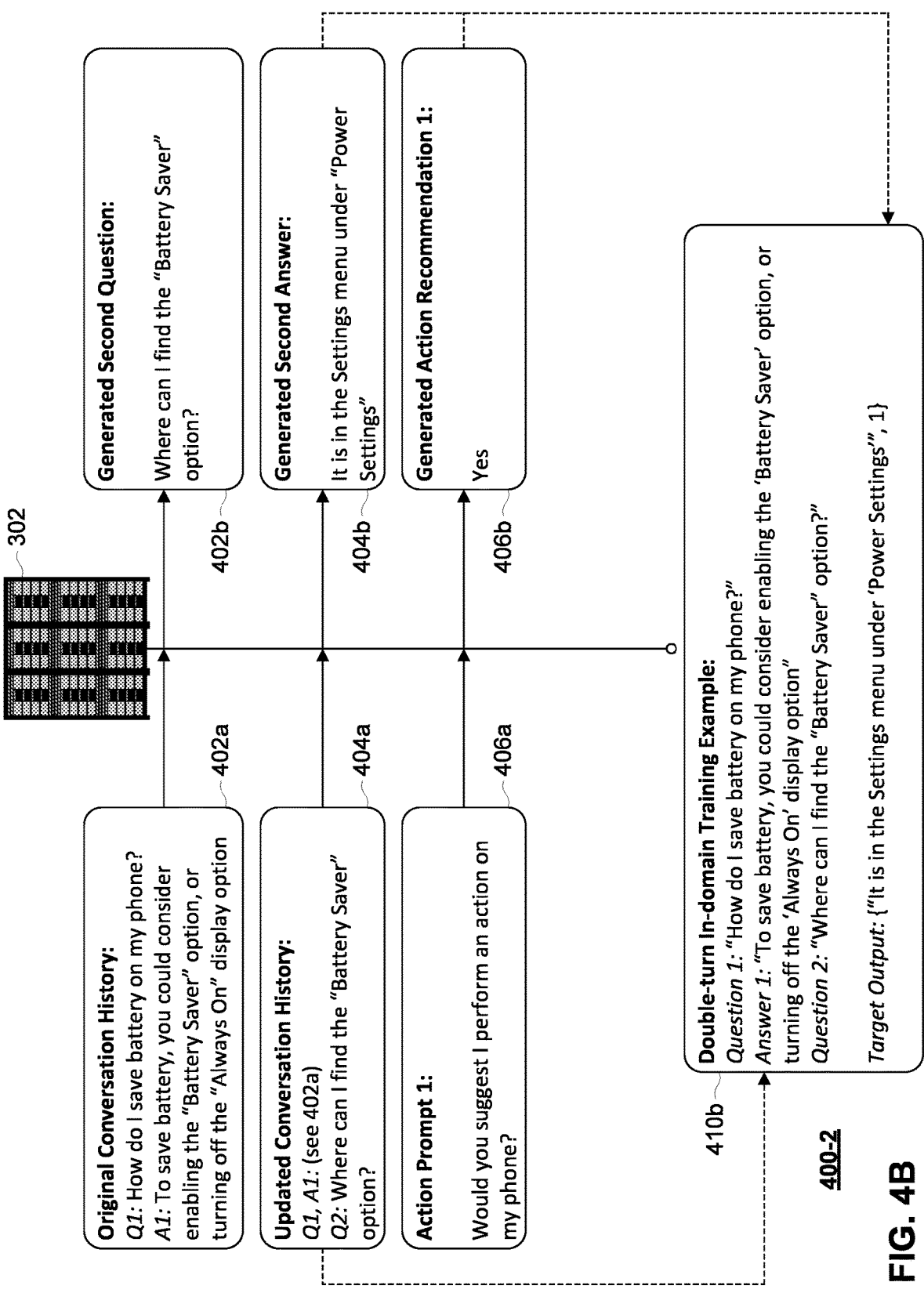

Original Conversation History:
*Q1:* How do I save battery on my phone?
*A1:* To save battery, you could consider enabling the "Battery Saver" option, or turning off the "Always On" display option 402a

Updated Conversation History:
*Q1, A1:* (see 402a)
*Q2:* Where can I find the "Battery Saver" option?

404a

Action Prompt 1:
Would you suggest I perform an action on my phone?

406a

302

Generated Second Question:
Where can I find the "Battery Saver" option?

402b

Generated Second Answer:
It is in the Settings menu under "Power Settings"

404b

Generated Action Recommendation 1:
Yes

406b

410b

Double-turn In-domain Training Example:
*Question 1:* "How do I save battery on my phone?"
*Answer 1:* "To save battery, you could consider enabling the 'Battery Saver' option, or turning off the 'Always On' display option"
*Question 2:* "Where can I find the "Battery Saver" option?"

*Target Output:* {"It is in the Settings menu under 'Power Settings'" , 1}

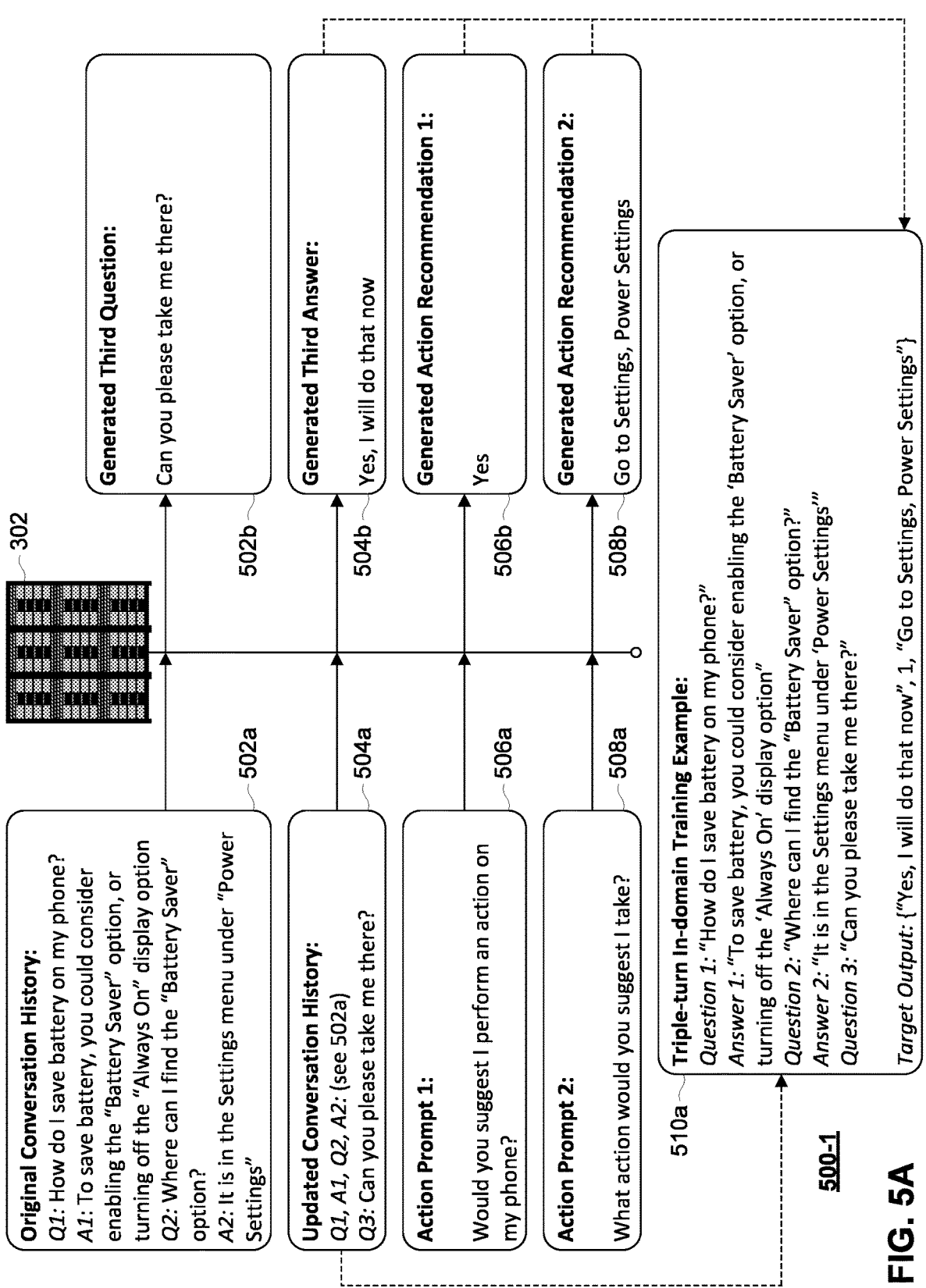

Original Conversation History:
*Q1:* How do I save battery on my phone?
*A1:* To save battery, you could consider enabling the "Battery Saver" option, or turning off the "Always On" display option
*Q2:* Where can I find the "Battery Saver" option?
*A2:* It is in the Settings menu under "Power Settings"

502a

Generated Third Question:
Can you please take me there?

502b

Updated Conversation History:
Q1, A1, Q2, A2. (see 502a)
Q3: Can you please take me there?

504a

Generated Third Answer:
Yes, I will do that now

504b

Action Prompt 1:
Would you suggest I perform an action on my phone?

506a

Generated Action Recommendation 1:
Yes

506b

Action Prompt 2:
What action would you suggest I take?

508a

Generated Action Recommendation 2:
Go to Settings, Power Settings

508b

302

510a

Triple-turn In-domain Training Example:
*Question 1:* "How do I save battery on my phone?"
*Answer 1:* "To save battery, you could consider enabling the 'Battery Saver' option, or turning off the 'Always On' display option"
*Question 2:* "Where can I find the 'Battery Saver' option?"
*Answer 2:* "It is in the Settings menu under 'Power Settings'"
*Question 3:* "Can you please take me there?"

*Target Output:* {"Yes, I will do that now", 1, "Go to Settings, Power Settings"}

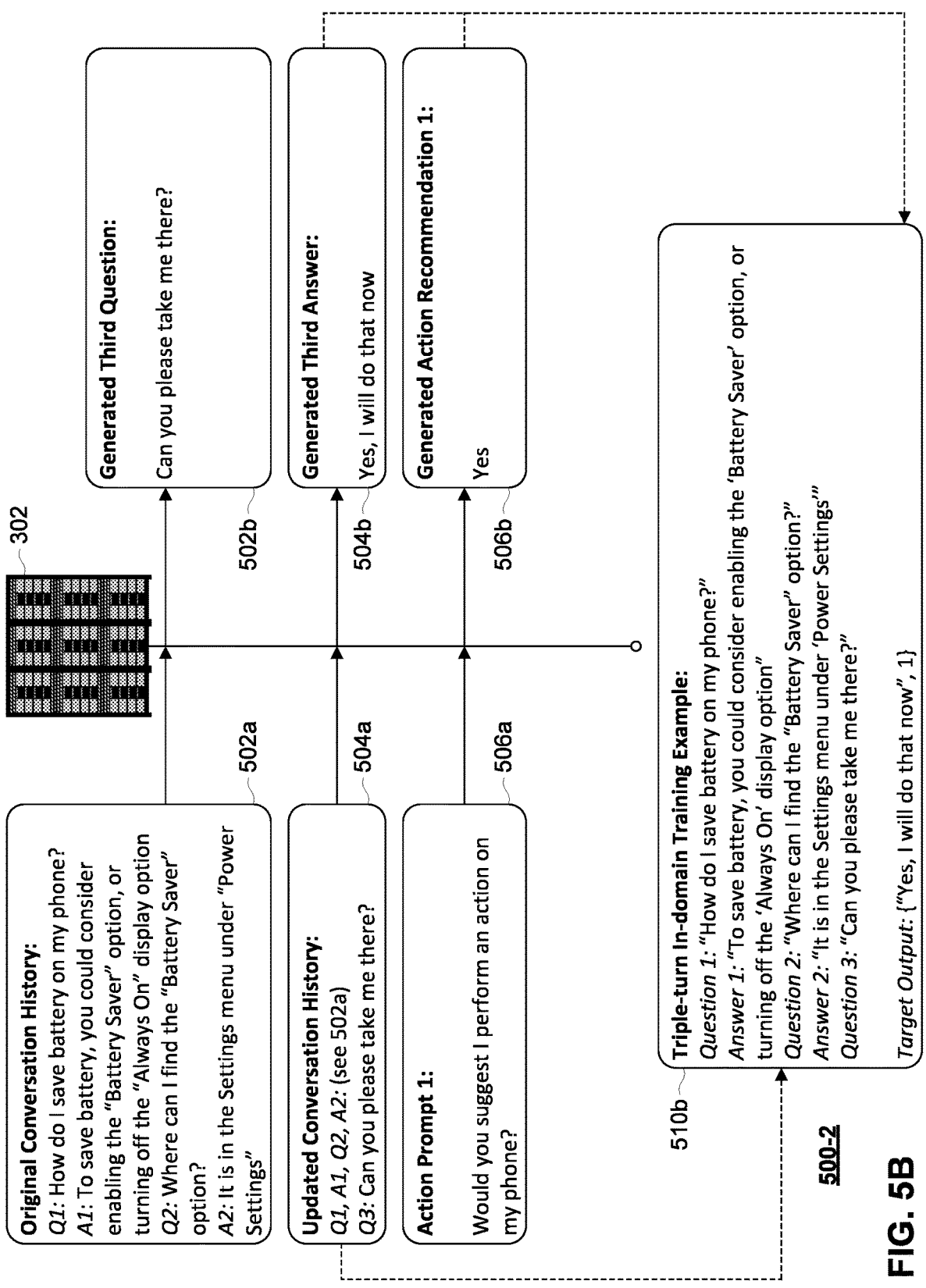

302

Original Conversation History:
*Q1:* How do I save battery on my phone?
*A1:* To save battery, you could consider enabling the "Battery Saver" option, or turning off the "Always On" display option
*Q2:* Where can I find the "Battery Saver" option?
*A2:* It is in the Settings menu under "Power Settings"

Generated Third Question:
Can you please take me there?

502a

502b

Updated Conversation History:
Q1, A1, Q2, A2: (see 502a)
Q3: Can you please take me there?

Generated Third Answer:
Yes, I will do that now

504a

504b

Action Prompt 1:
Would you suggest I perform an action on my phone?

Generated Action Recommendation 1:
Yes

506a

506b

Triple-turn In-domain Training Example:
*Question 1:* "How do I save battery on my phone?"
*Answer 1:* "To save battery, you could consider enabling the 'Battery Saver' option, or turning off the 'Always On' display option"
*Question 2:* "Where can I find the "Battery Saver" option?"
*Answer 2:* "It is in the Settings menu under 'Power Settings'"
*Question 3:* "Can you please take me there?"

*Target Output:* {"Yes, I will do that now", 1}

Out-of-domain Question:

Who was the first president of the United States?

602

Predetermined Answer:

I don't know

604

Predetermined Action Recommendation:

0

606

608

Single-turn Out-of-domain Training Example:

*Question:* "Who was the first president of the United States?"

*Target Output:* {"I don't know", 0}

600

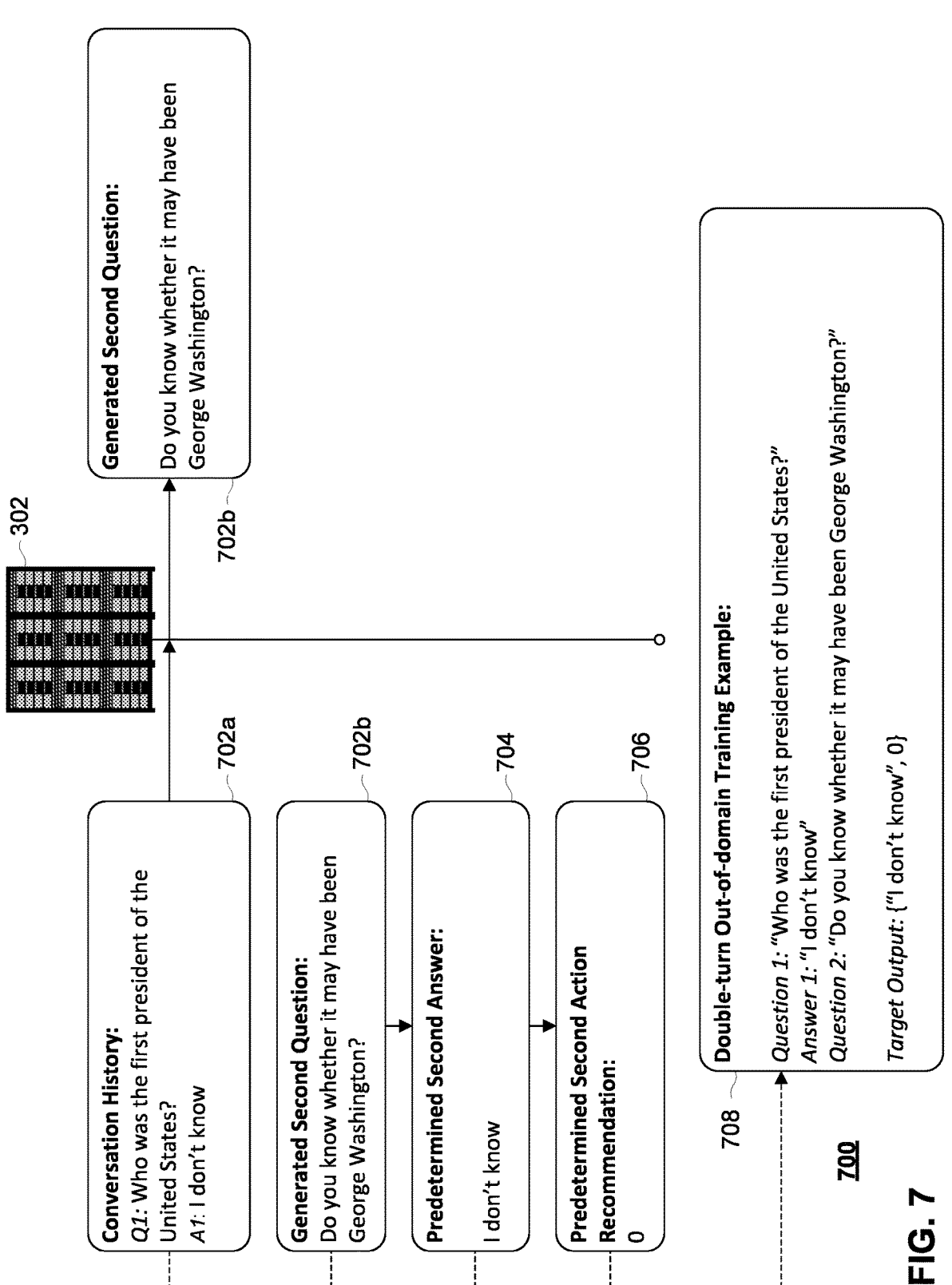

Generated Second Question:

Do you know whether it may have been George Washington?

302

702b

Conversation History:

*Q1*: Who was the first president of the United States?

*A1*: I don't know

702a

Generated Second Question:

Do you know whether it may have been George Washington?

702b

Predetermined Second Answer:

I don't know

704

Predetermined Second Action Recommendation:

0

706

Double-turn Out-of-domain Training Example:

*Question 1*: "Who was the first president of the United States?"

*Answer 1*: "I don't know"

*Question 2*: "Do you know whether it may have been George Washington?"

*Target Output*: {"I don't know", 0}

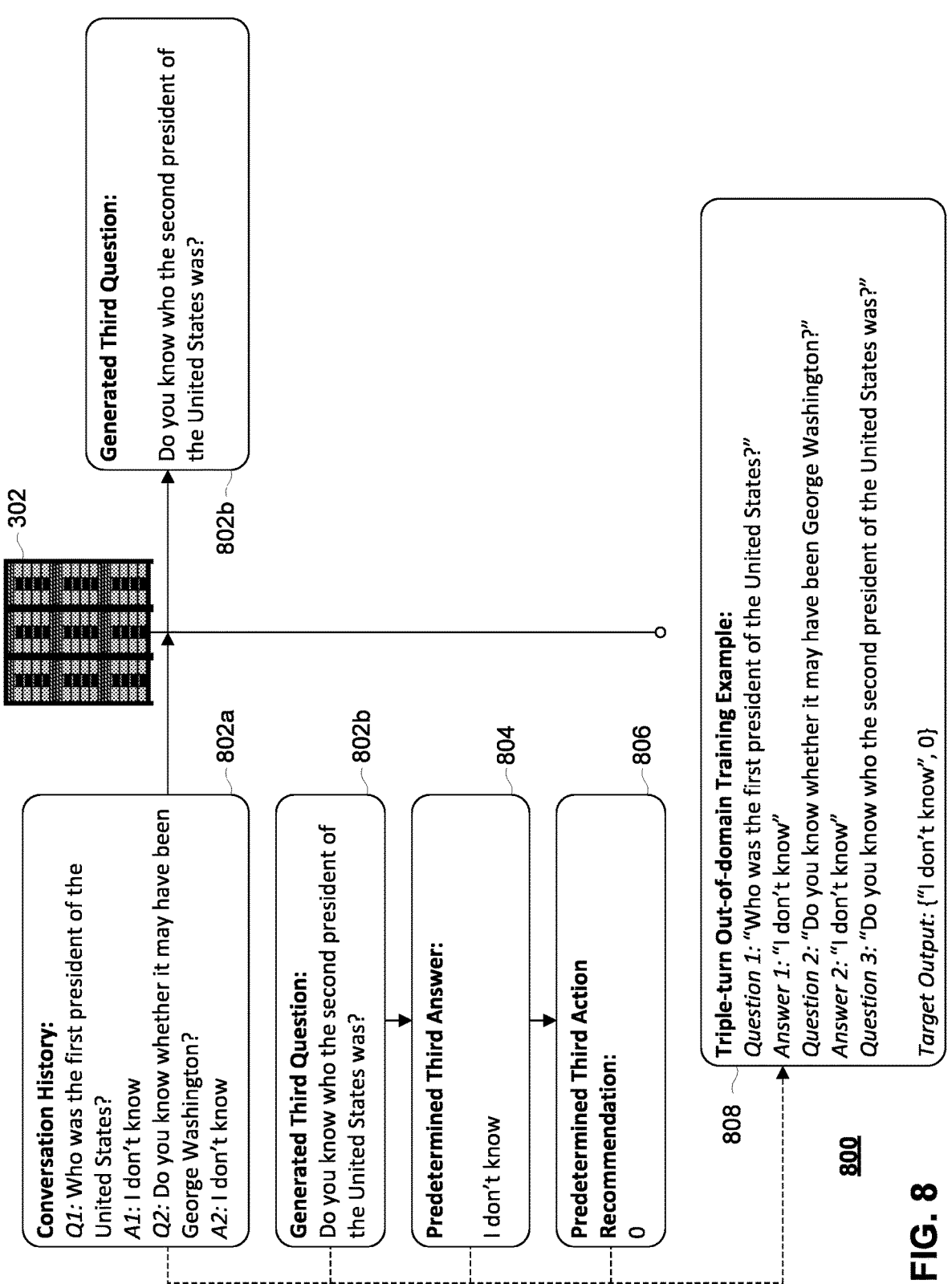

Conversation History:
Q1: Who was the first president of the
United States?
A1: I don't know
Q2: Do you know whether it may have been
George Washington?
A2: I don't know

302

Generated Third Question:
Do you know who the second president of
the United States was?

802a

802b

Generated Third Question:
Do you know who the second president of
the United States was?

802b

Predetermined Third Answer:
I don't know

804

**Predetermined Third Action
Recommendation:**
0

806

Triple-turn Out-of-domain Training Example:
*Question 1:* "Who was the first president of the United States?"
*Answer 1:* "I don't know"
*Question 2:* "Do you know whether it may have been George Washington?"
*Answer 2:* "I don't know"
*Question 3:* "Do you know who the second president of the United States was?"

*Target Output:* {"I don't know", 0}

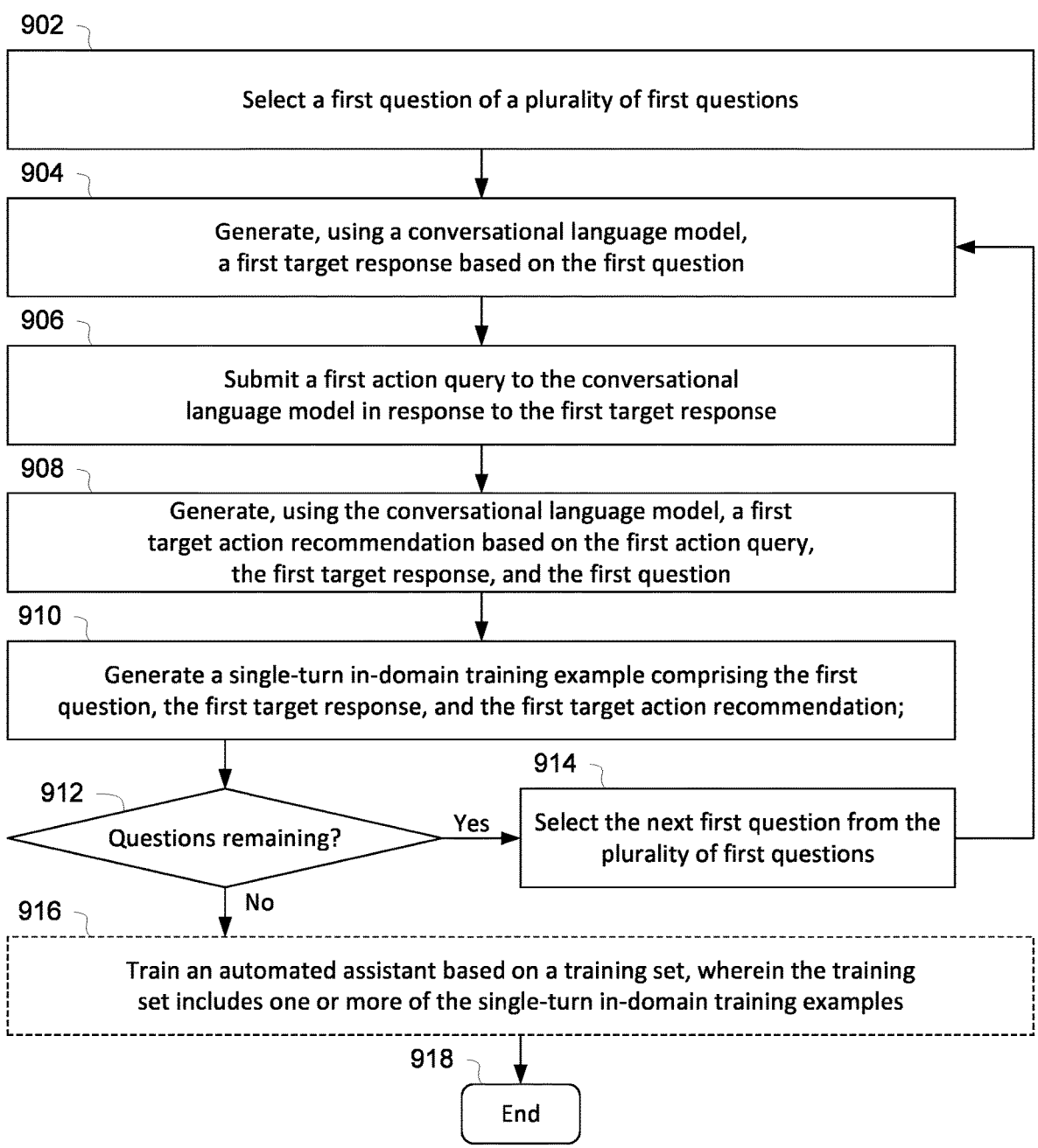

902

Select a first question of a plurality of first questions

904

Generate, using a conversational language model,
a first target response based on the first question

906

Submit a first action query to the conversational
language model in response to the first target response

908

Generate, using the conversational language model, a first
target action recommendation based on the first action query,
the first target response, and the first question

910

Generate a single-turn in-domain training example comprising the first
question, the first target response, and the first target action recommendation;

912

Questions remaining?

914

Yes → Select the next first question from the
plurality of first questions

916

No

Train an automated assistant based on a training set, wherein the training
set includes one or more of the single-turn in-domain training examples

918

End

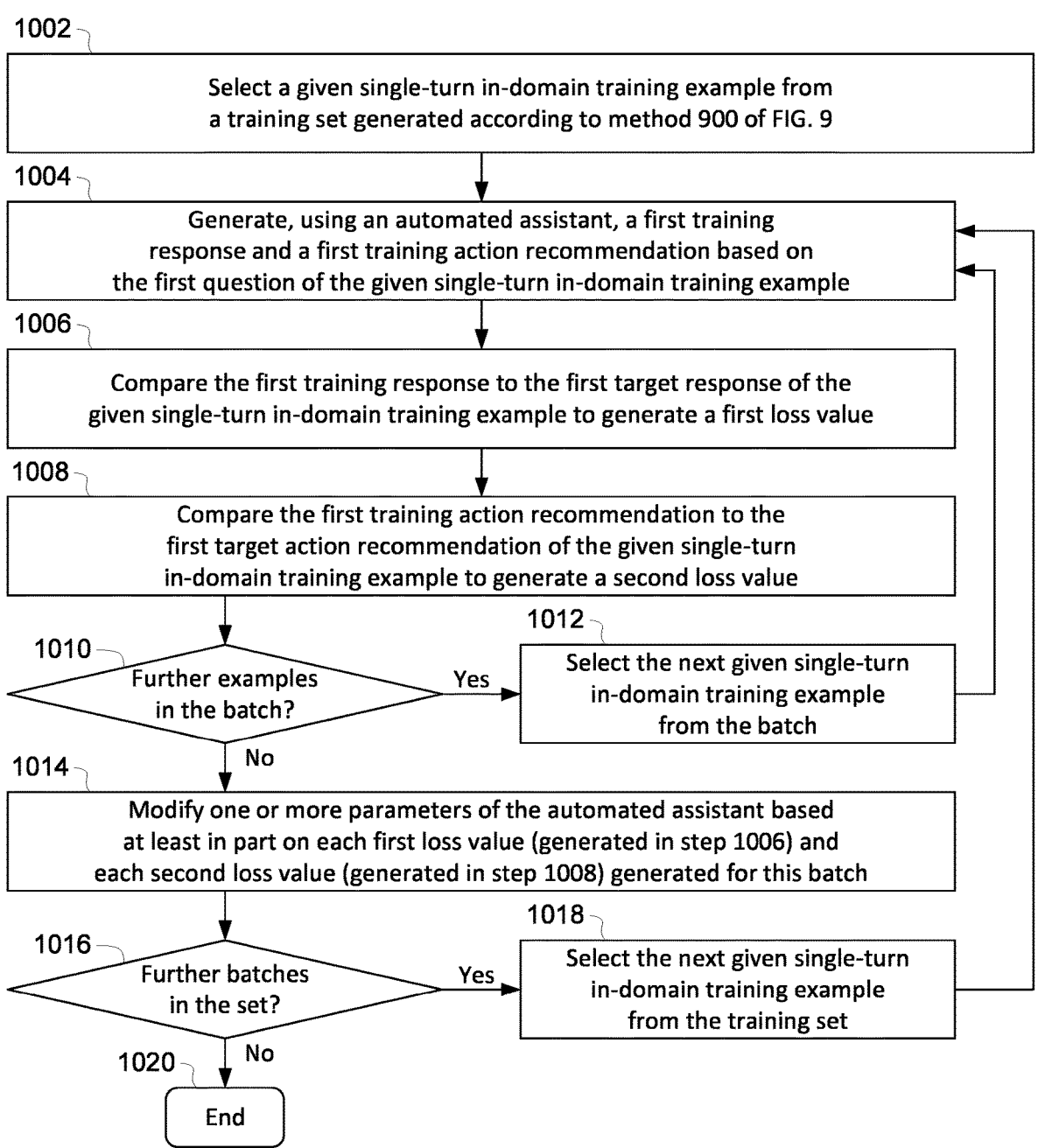

1002

Select a given single-turn in-domain training example from
a training set generated according to method 900 of FIG. 9

1004

Generate, using an automated assistant, a first training
response and a first training action recommendation based on
the first question of the given single-turn in-domain training example

1006

Compare the first training response to the first target response of the
given single-turn in-domain training example to generate a first loss value

1008

Compare the first training action recommendation to the
first target action recommendation of the given single-turn
in-domain training example to generate a second loss value 1010
Further examples
in the batch?

1012
Select the next given single-turn
in-domain training example
from the batch Yes No

1014

Modify one or more parameters of the automated assistant based
at least in part on each first loss value (generated in step 1006) and
each second loss value (generated in step 1008) generated for this batch 1016
Further batches
in the set?

1018
Select the next given single-turn
in-domain training example
from the training set Yes No

1020

End

Figure 11:
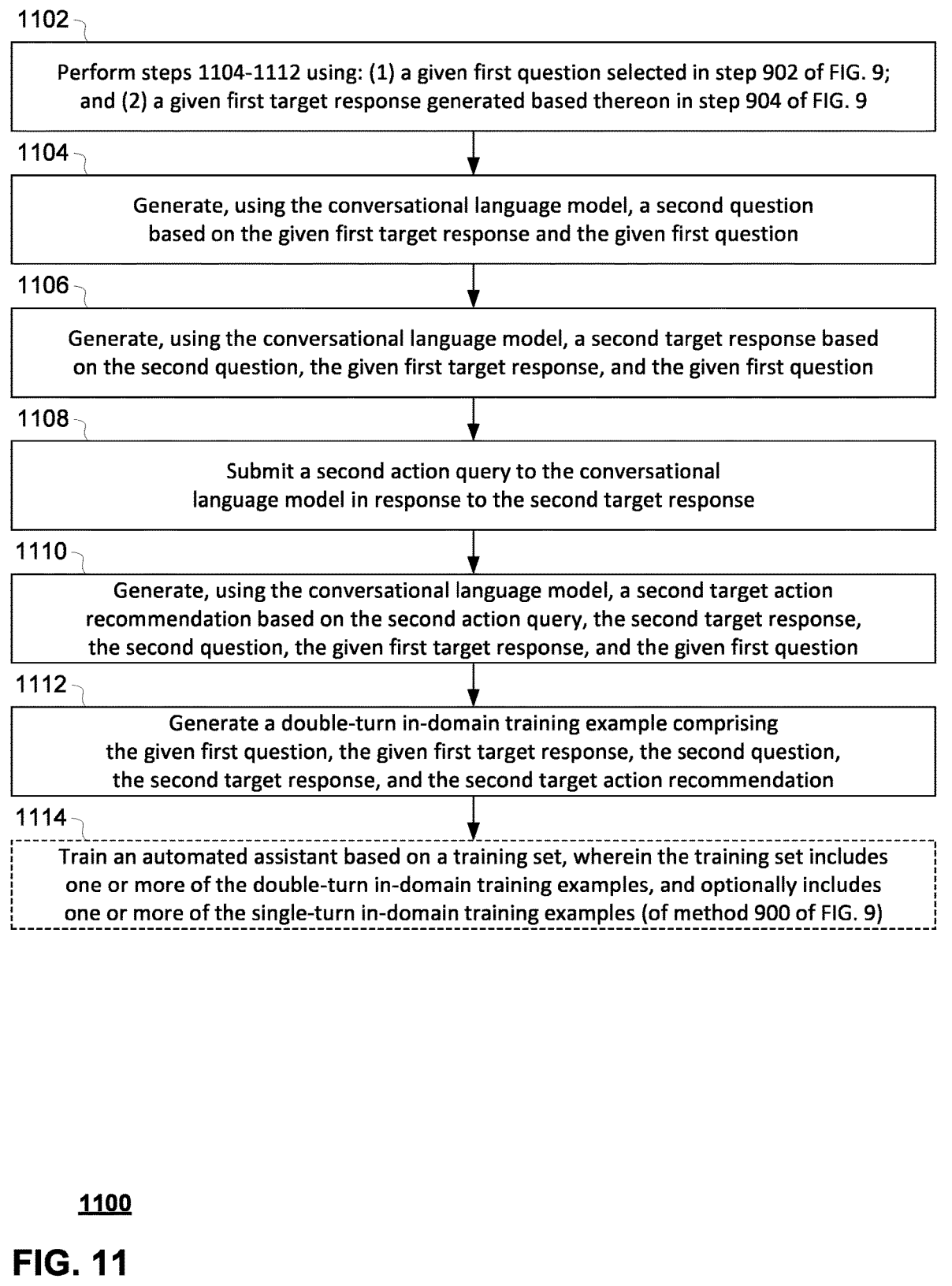

Perform steps 1104-1112 using: (1) a given first question selected in step 902 of FIG. 9; and (2) a given first target response generated based thereon in step 904 of FIG. 9

1104

Generate, using the conversational language model, a second question based on the given first target response and the given first question

1106

Generate, using the conversational language model, a second target response based on the second question, the given first target response, and the given first question

1108

Submit a second action query to the conversational language model in response to the second target response

1110

Generate, using the conversational language model, a second target action recommendation based on the second action query, the second target response, the second question, the given first target response, and the given first question

1112

Generate a double-turn in-domain training example comprising the given first question, the given first target response, the second question, the second target response, and the second target action recommendation

1114

Train an automated assistant based on a training set, wherein the training set includes one or more of the double-turn in-domain training examples, and optionally includes one or more of the single-turn in-domain training examples (of method 900 of FIG. 9)

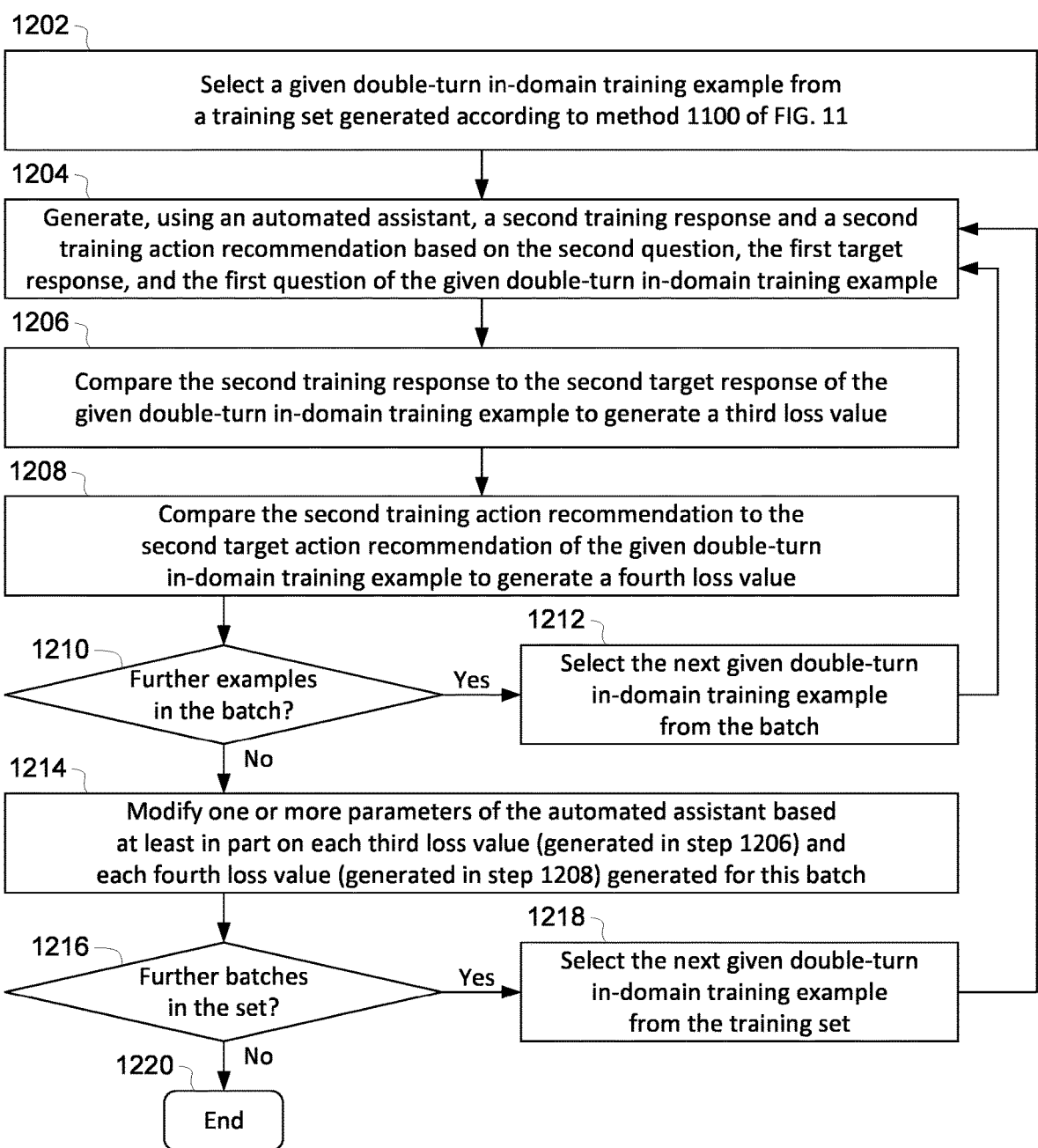

1202

Select a given double-turn in-domain training example from
a training set generated according to method 1100 of FIG. 11

1204

Generate, using an automated assistant, a second training response and a second
training action recommendation based on the second question, the first target
response, and the first question of the given double-turn in-domain training example

1206

Compare the second training response to the second target response of the
given double-turn in-domain training example to generate a third loss value

1208

Compare the second training action recommendation to the
second target action recommendation of the given double-turn
in-domain training example to generate a fourth loss value 1210
Further examples
in the batch?

1212
Yes
Select the next given double-turn
in-domain training example
from the batch 1214
No
Modify one or more parameters of the automated assistant based
at least in part on each third loss value (generated in step 1206) and
each fourth loss value (generated in step 1208) generated for this batch 1216
Further batches
in the set?

1218
Yes
Select the next given double-turn
in-domain training example
from the training set 1220
No
End

Figure 13:
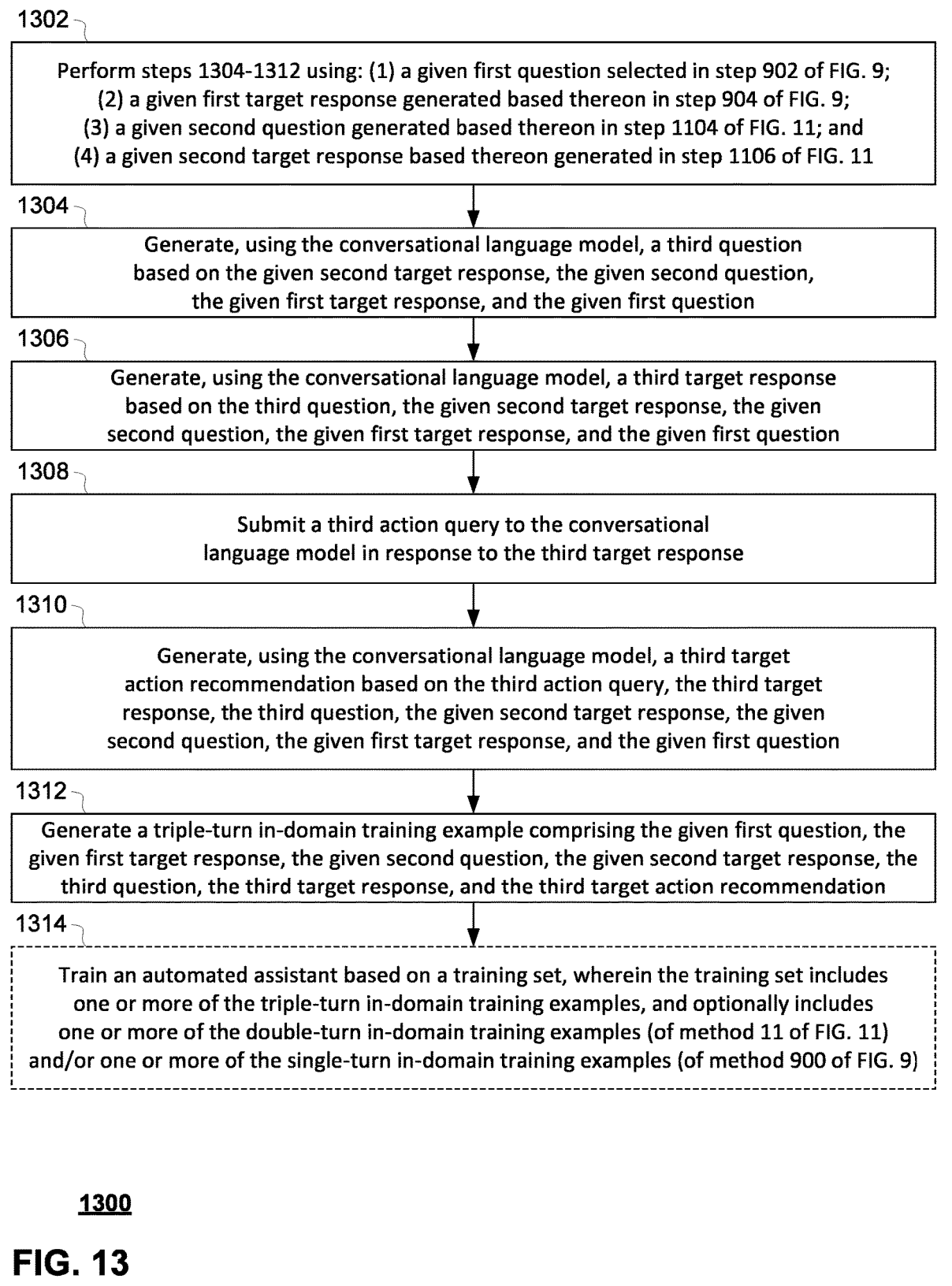

Perform steps 1304-1312 using: (1) a given first question selected in step 902 of FIG. 9; (2) a given first target response generated based thereon in step 904 of FIG. 9; (3) a given second question generated based thereon in step 1104 of FIG. 11; and (4) a given second target response based thereon generated in step 1106 of FIG. 11

1304

Generate, using the conversational language model, a third question based on the given second target response, the given second question, the given first target response, and the given first question

1306

Generate, using the conversational language model, a third target response based on the third question, the given second target response, the given second question, the given first target response, and the given first question

1308

Submit a third action query to the conversational language model in response to the third target response

1310

Generate, using the conversational language model, a third target action recommendation based on the third action query, the third target response, the third question, the given second target response, the given second question, the given first target response, and the given first question

1312

Generate a triple-turn in-domain training example comprising the given first question, the given first target response, the given second question, the given second target response, the third question, the third target response, and the third target action recommendation

1314

Train an automated assistant based on a training set, wherein the training set includes one or more of the triple-turn in-domain training examples, and optionally includes one or more of the double-turn in-domain training examples (of method 11 of FIG. 11) and/or one or more of the single-turn in-domain training examples (of method 900 of FIG. 9)

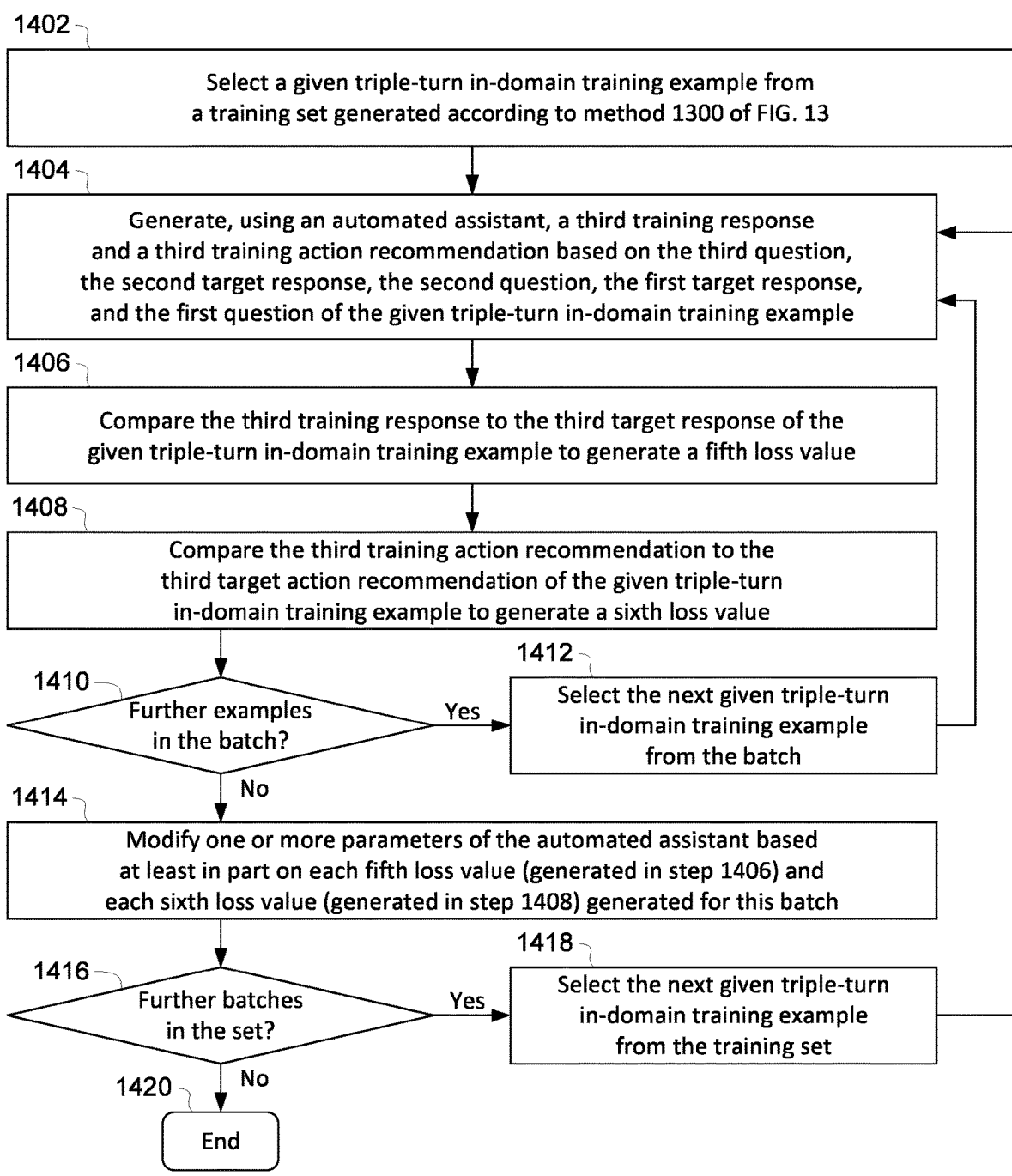

1402
Select a given triple-turn in-domain training example from
a training set generated according to method 1300 of FIG. 13

1404
Generate, using an automated assistant, a third training response
and a third training action recommendation based on the third question,
the second target response, the second question, the first target response,
and the first question of the given triple-turn in-domain training example 1406
Compare the third training response to the third target response of the
given triple-turn in-domain training example to generate a fifth loss value 1408
Compare the third training action recommendation to the
third target action recommendation of the given triple-turn
in-domain training example to generate a sixth loss value 1410
Further examples
in the batch?

1412
Yes → Select the next given triple-turn
in-domain training example
from the batch No 1414
Modify one or more parameters of the automated assistant based
at least in part on each fifth loss value (generated in step 1406) and
each sixth loss value (generated in step 1408) generated for this batch 1416
Further batches
in the set?

1418
Yes → Select the next given triple-turn
in-domain training example
from the training set No 1420
End

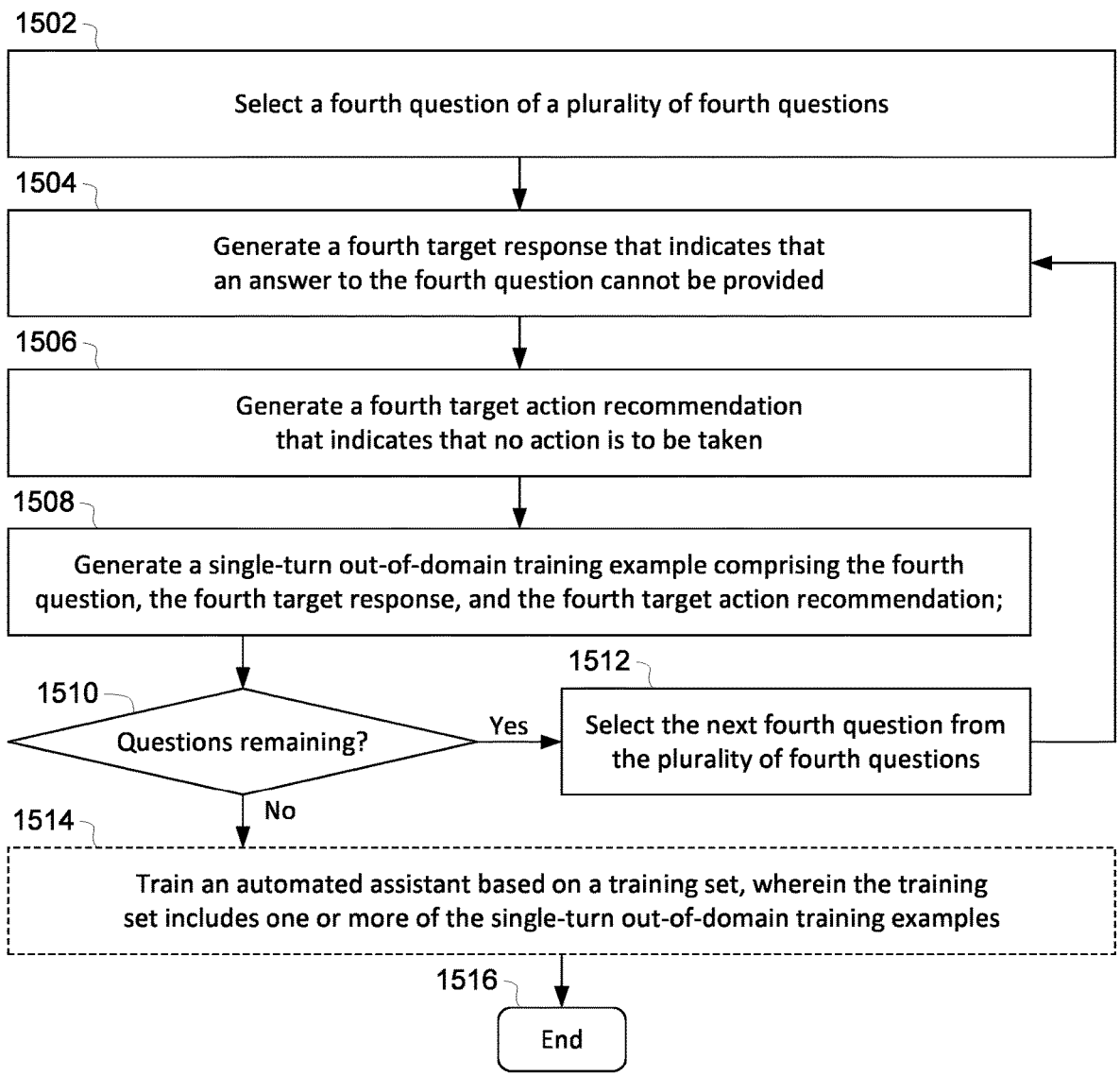

1502

Select a fourth question of a plurality of fourth questions

1504

Generate a fourth target response that indicates that
an answer to the fourth question cannot be provided

1506

Generate a fourth target action recommendation
that indicates that no action is to be taken

1508

Generate a single-turn out-of-domain training example comprising the fourth
question, the fourth target response, and the fourth target action recommendation;

1510

Questions remaining?

1512

Yes → Select the next fourth question from
the plurality of fourth questions

No

1514

Train an automated assistant based on a training set, wherein the training
set includes one or more of the single-turn out-of-domain training examples

1516

End

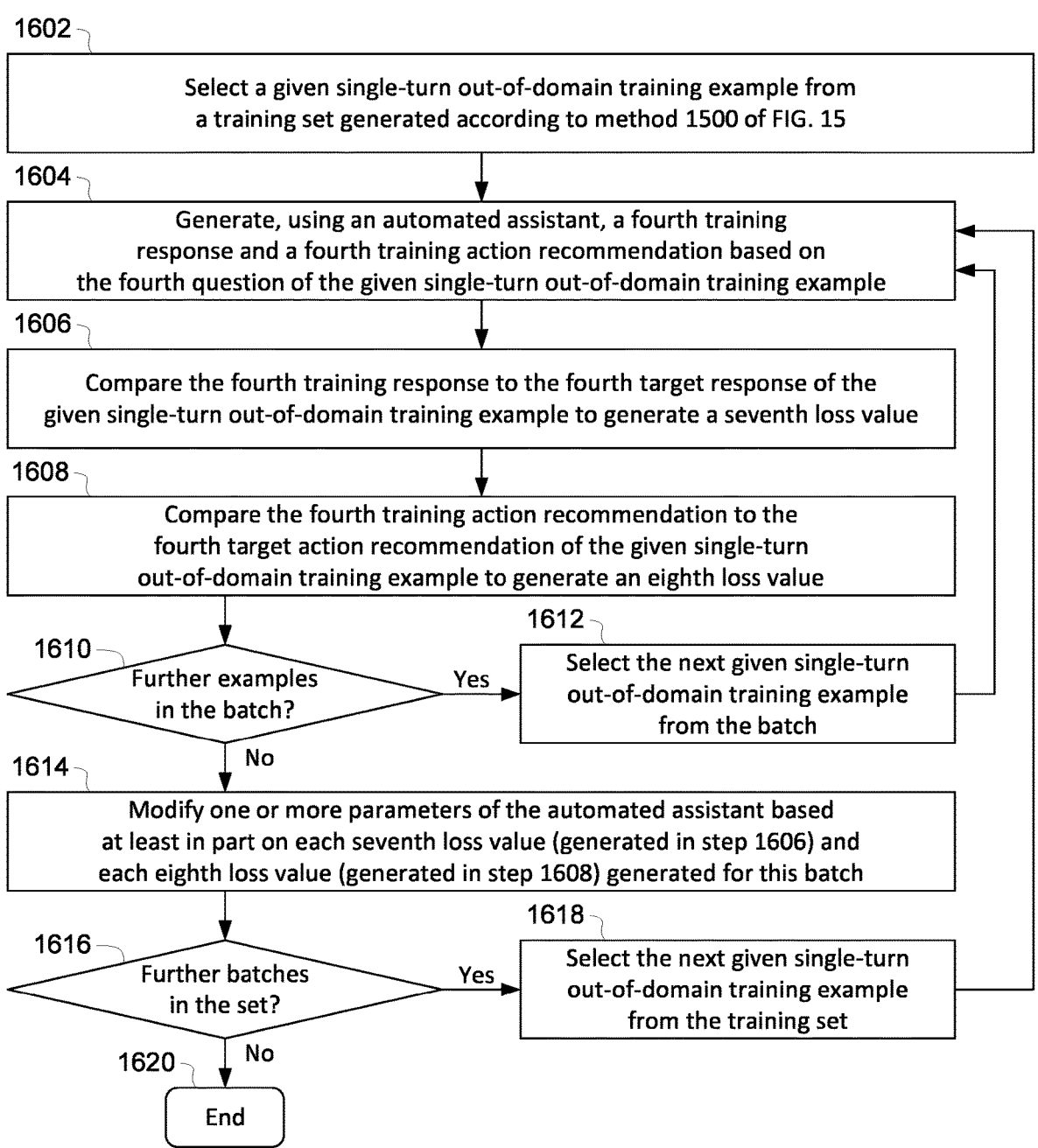

1602

Select a given single-turn out-of-domain training example from
a training set generated according to method 1500 of FIG. 15

1604

Generate, using an automated assistant, a fourth training
response and a fourth training action recommendation based on
the fourth question of the given single-turn out-of-domain training example

1606

Compare the fourth training response to the fourth target response of the
given single-turn out-of-domain training example to generate a seventh loss value

1608

Compare the fourth training action recommendation to the
fourth target action recommendation of the given single-turn
out-of-domain training example to generate an eighth loss value 1610
Further examples
in the batch?

1612
Yes → Select the next given single-turn
out-of-domain training example
from the batch No 1614
Modify one or more parameters of the automated assistant based
at least in part on each seventh loss value (generated in step 1606) and
each eighth loss value (generated in step 1608) generated for this batch 1616
Further batches
in the set?

1618
Yes → Select the next given single-turn
out-of-domain training example
from the training set No 1620
End

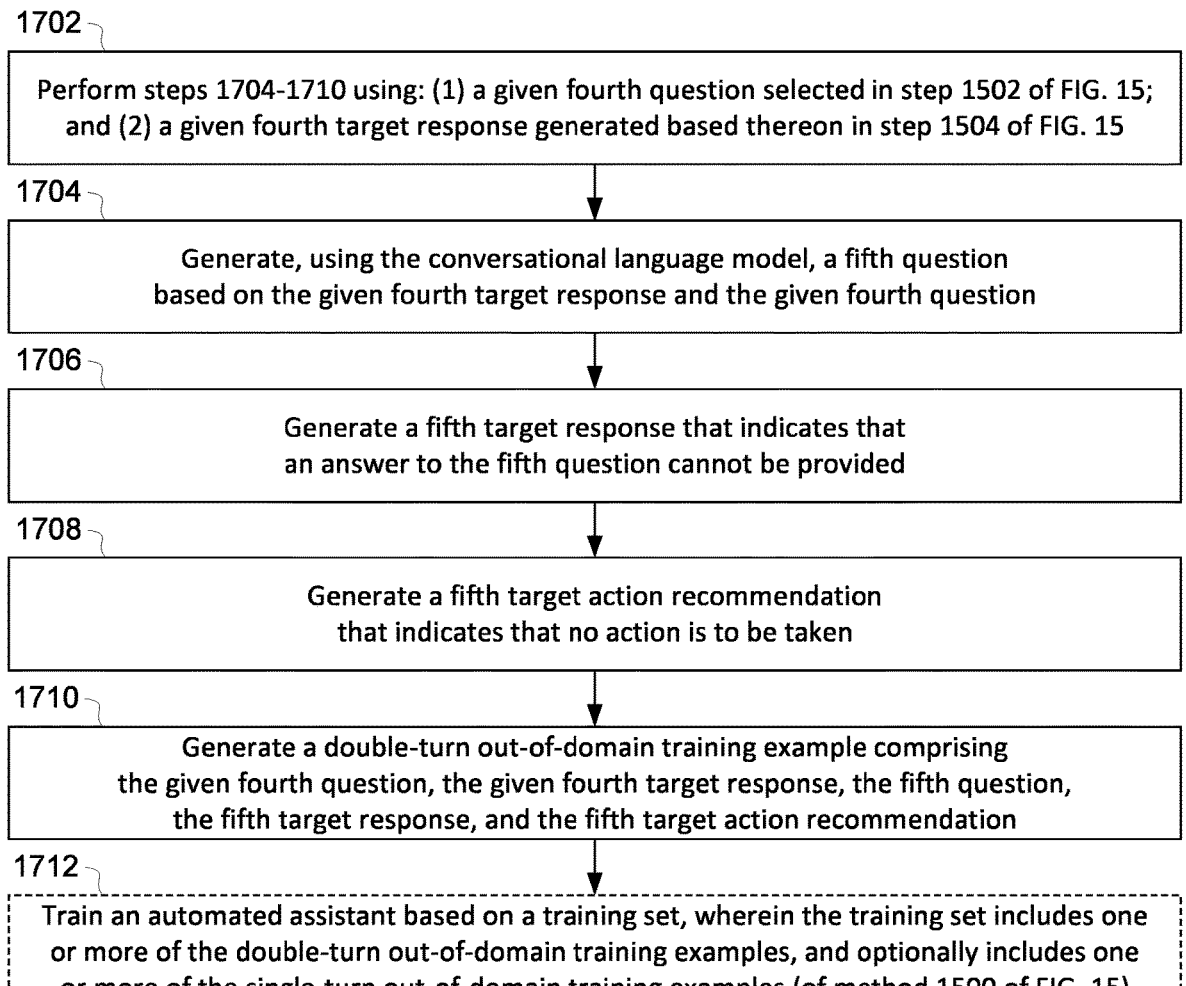

1702

Perform steps 1704-1710 using: (1) a given fourth question selected in step 1502 of FIG. 15; and (2) a given fourth target response generated based thereon in step 1504 of FIG. 15

1704

Generate, using the conversational language model, a fifth question based on the given fourth target response and the given fourth question

1706

Generate a fifth target response that indicates that an answer to the fifth question cannot be provided

1708

Generate a fifth target action recommendation that indicates that no action is to be taken

1710

Generate a double-turn out-of-domain training example comprising the given fourth question, the given fourth target response, the fifth question, the fifth target response, and the fifth target action recommendation

1712

Train an automated assistant based on a training set, wherein the training set includes one or more of the double-turn out-of-domain training examples, and optionally includes one or more of the single-turn out-of-domain training examples (of method 1500 of FIG. 15)

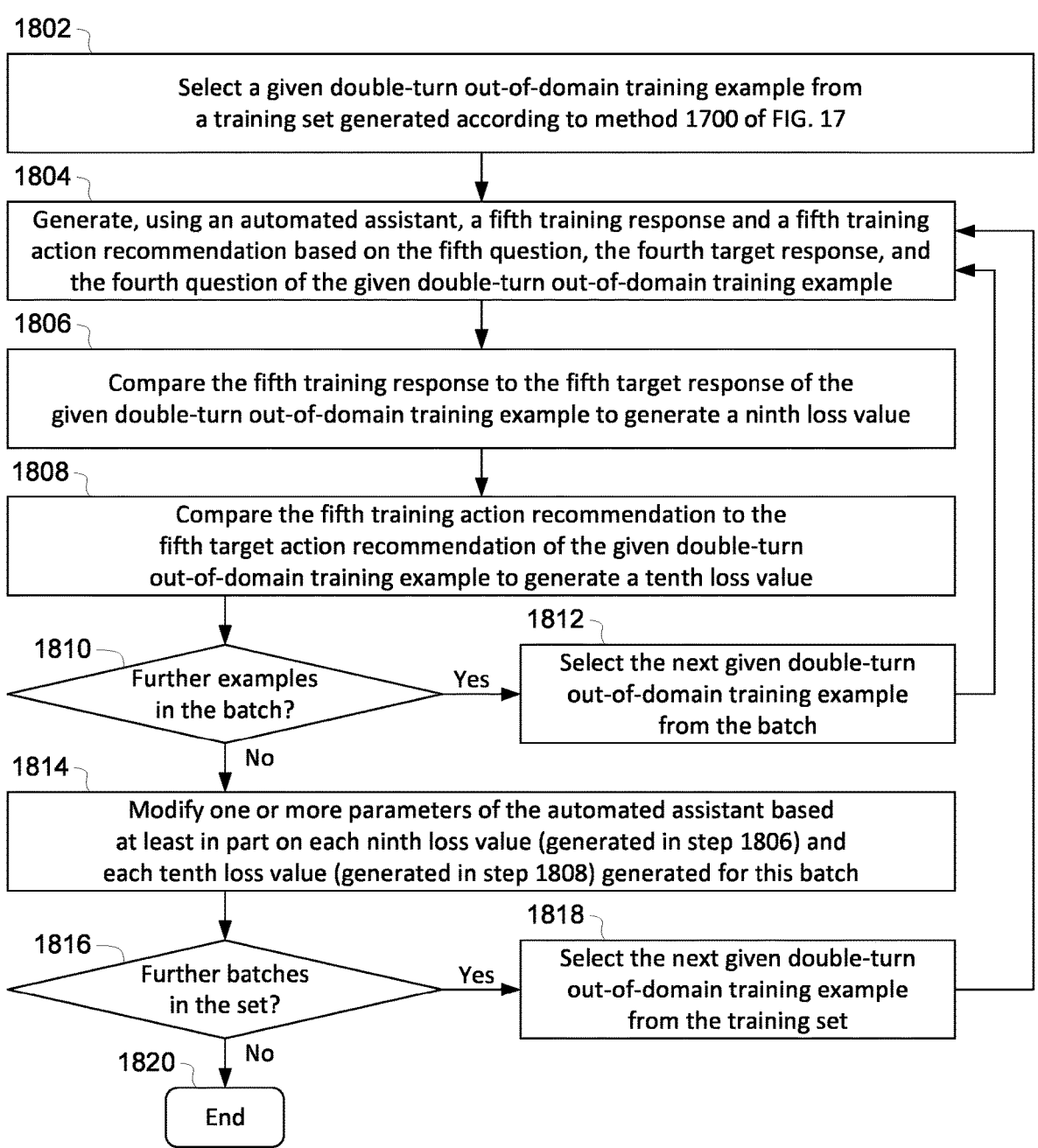

1802

Select a given double-turn out-of-domain training example from
a training set generated according to method 1700 of FIG. 17

1804

Generate, using an automated assistant, a fifth training response and a fifth training
action recommendation based on the fifth question, the fourth target response, and
the fourth question of the given double-turn out-of-domain training example

1806

Compare the fifth training response to the fifth target response of the
given double-turn out-of-domain training example to generate a ninth loss value

1808

Compare the fifth training action recommendation to the
fifth target action recommendation of the given double-turn
out-of-domain training example to generate a tenth loss value 1810
Further examples
in the batch?

1812
Yes → Select the next given double-turn
out-of-domain training example
from the batch No

1814

Modify one or more parameters of the automated assistant based
at least in part on each ninth loss value (generated in step 1806) and
each tenth loss value (generated in step 1808) generated for this batch 1816
Further batches
in the set?

1818
Yes → Select the next given double-turn
out-of-domain training example
from the training set No 1820
End

Figure 19:
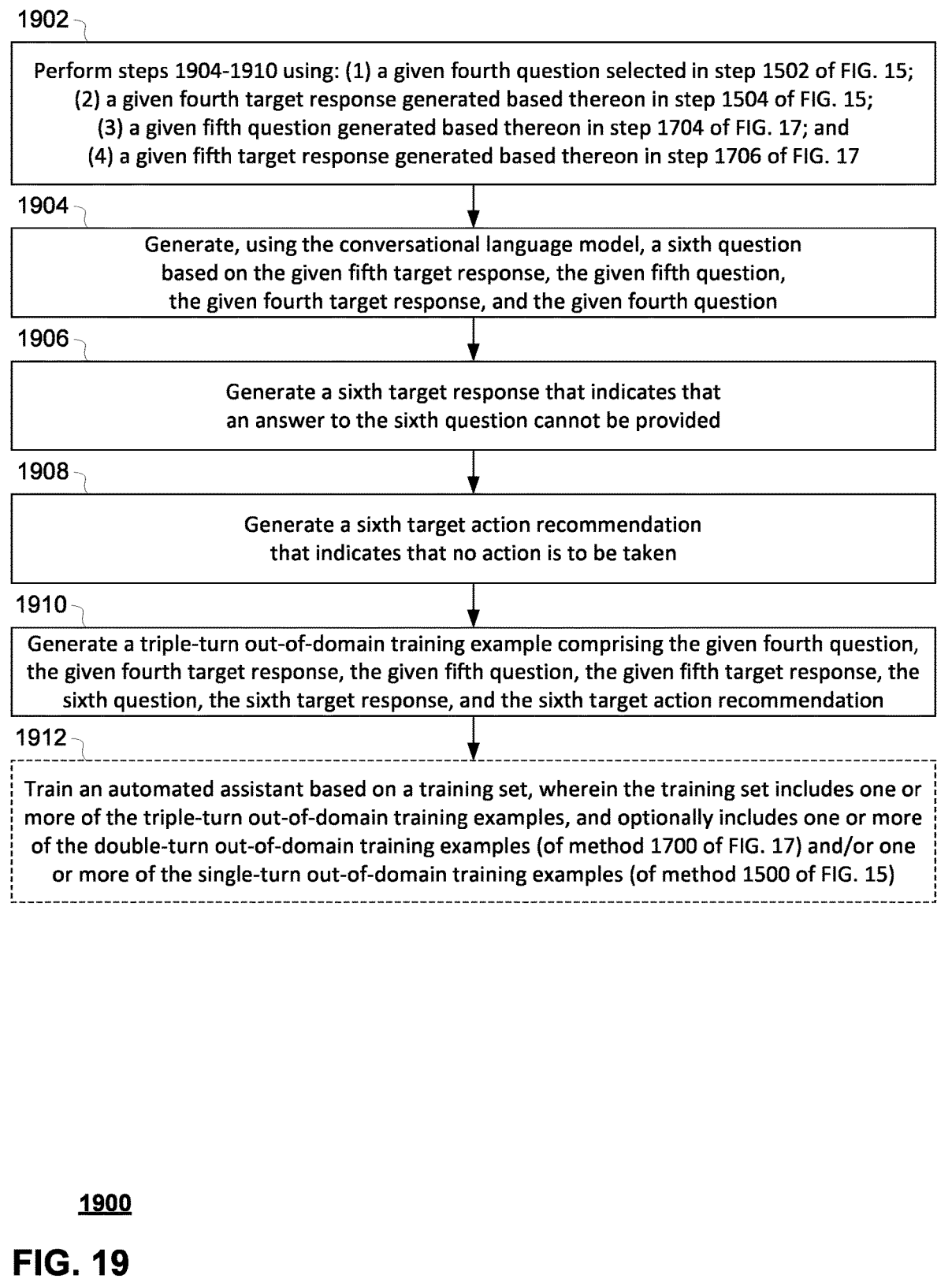

Perform steps 1904-1910 using: (1) a given fourth question selected in step 1502 of FIG. 15; (2) a given fourth target response generated based thereon in step 1504 of FIG. 15; (3) a given fifth question generated based thereon in step 1704 of FIG. 17; and (4) a given fifth target response generated based thereon in step 1706 of FIG. 17

1904

Generate, using the conversational language model, a sixth question based on the given fifth target response, the given fifth question, the given fourth target response, and the given fourth question

1906

Generate a sixth target response that indicates that an answer to the sixth question cannot be provided

1908

Generate a sixth target action recommendation that indicates that no action is to be taken

1910

Generate a triple-turn out-of-domain training example comprising the given fourth question, the given fourth target response, the given fifth question, the given fifth target response, the sixth question, the sixth target response, and the sixth target action recommendation

1912

Train an automated assistant based on a training set, wherein the training set includes one or more of the triple-turn out-of-domain training examples, and optionally includes one or more of the double-turn out-of-domain training examples (of method 1700 of FIG. 17) and/or one or more of the single-turn out-of-domain training examples (of method 1500 of FIG. 15)

DOMAIN-SPECIFIC CONVERSATIONAL AUTOMATED ASSISTANT

CROSS-REFERENCE TO RELATED APPLICATIONS

The present application is a national phase entry under 35 U.S.C. § 371 of International Application No. PCT/US22/11639, filed Jan. 7, 2022, published in English, the entire disclosure of which is incorporated herein by reference.

BACKGROUND

Advances in machine learning continue to result in improved language models. One goal has been to create a model capable of conducting sensible, open-ended, multi-turn conversations with human users. Models such as GPT-3, and more recently LaMDA, are beginning to achieve this objective. However, in order to produce suitable results in open-ended conversation, such models are generally extremely large (e.g., 10 billion parameters to more than 1 trillion parameters), run on extremely powerful hardware, and are trained on vast amounts of data spanning a wide range of topics. As a result, although state-of-the-art conversational models may be capable of functioning as automated assistants, they may be more knowledgeable than necessary for such tasks, and may be too large and/or resource-intensive for use on many devices.

BRIEF SUMMARY

The present technology concerns systems and methods for generating a domain-specific conversational automated assistant. In some aspects, a conversational language model (e.g., LaMDA, GPT-3) is used to generate a target answer and a target action recommendation in response to each of a set of in-domain training questions. In some aspects, the conversational language model is further used to generate follow-up questions to one or more of its generated target answers, and to then generate a target answer and target action recommendation to each generated follow-up question. In addition, in some aspects, the processing system also generates a set of out-of-domain training examples that include an out-of-domain question, a predetermined target answer (e.g., "I don't know," "I cannot answer that"), and a predetermined target action recommendation (e.g., 0, "none"). A separate automated assistant (e.g., a smaller model configured to run on a mobile phone, tablet, personal computer) is then trained to predict the generated target answers and target action recommendations based on the associated training question or generated follow-up question, as well as any prior questions and answers in the conversation.

In this way, a very large language model (e.g., LaMDA, GPT-3) optimized for conversation may be used to automatically generate large volumes of domain-specific training examples (both single-turn and multi-turn), and related action recommendations. Those training examples may then be used to train a much smaller automated assistant (e.g., a model with 1,000-100,000 fewer parameters) to converse naturally within that specific domain, and to anticipate where actions may be suggested and/or taken (e.g., even before being directly asked to do so). Thus, while a language model capable of adequately responding to conversational inputs may be too large to reside on many devices (e.g., personal computers, mobile phones, tablets, smart home devices, etc.), the present technology may be used to leverage the knowledge of a very large conversational language model to automatically train a much smaller automated assistant (e.g., one capable of being stored on smaller devices with constrained memory space and/or limited processing power, such as personal computers, mobile phones, tablets, smart home devices, etc.) to converse and assist a user with requests confined to a particular domain. For example, the automated assistant may be trained to answer questions and suggest actions about how to operate a device on which the automated assistant resides.

In one aspect, the disclosure describes a computer-implemented method, comprising: (1) for each first question of a plurality of first questions: generating, using a conversational language model, a first target response based on the first question; submitting, using one or more processors of a processing system, a first action query to the conversational language model in response to the first target response; generating, using the conversational language model, a first target action recommendation based on the first action query, the first target response, and the first question; generating, using the one or more processors, a single-turn in-domain training example comprising the first question, the first target response, and the first target action recommendation; generating, using the conversational language model, a second question based on the first target response and the first question; generating, using the conversational language model, a second target response based on the second question, the first target response, and the first question; submitting, using the one or more processors, a second action query to the conversational language model in response to the second target response; generating, using the conversational language model, a second target action recommendation based on the second action query, the second target response, the second question, the first target response, and the first question; and generating, using the one or more processors, a double-turn in-domain training example comprising the first question, the first target response, the second question, the second target response, and the second target action recommendation; and (2) training an automated assistant, using the one or more processors, based on a training set, wherein the training set includes one or more of the single-turn in-domain training examples, and one or more of the double-turn in-domain training examples. In some aspects, training the automated assistant based on the training set comprises: (1) for each given single-turn in-domain training example in the training set: generating, using the automated assistant, a first training response and a first training action recommendation based on the first question of the given single-turn in-domain training example; comparing, using the one or more processors, the first training response to the first target response of the given single-turn in-domain training example to generate a first loss value; and comparing, using the one or more processors, the first training action recommendation to the first target action recommendation of the given single-turn in-domain training example to generate a second loss value; and (2) modifying, using the one or more processors, one or more parameters of the automated assistant based at least in part on the generated first loss values and the generated second loss values. In some aspects, the first target action recommendation and the first training action recommendation both comprise one or more of: an indication of whether to take an action; an identification of an action to be taken; or instructions that, when executed by one or more processors of a given device, cause the given device to take an action. In some aspects, training the automated assistant based on the training set further comprises: (1) for each given double-turn in-domain training example in the training set: generating, using the automated assistant, a second training response and a second training action recommendation based on the second question, the first target response, and the first question of the given double-turn in-domain training example; comparing, using the one or more processors, the second training response to the second target response of the given double-turn in-domain training example to generate a third loss value; and comparing, using the one or more processors, the second training action recommendation to the second target action recommendation of the given double-turn in-domain training example to generate a fourth loss value; and (2) modifying, using the one or more processors, one or more parameters of the automated assistant based at least in part on the generated third loss values and the generated fourth loss values. In some aspects, the second target action recommendation and the second training action recommendation both comprise one or more of: an indication of whether to take an action; an identification of an action to be taken; or instructions that, when executed by one or more processors of a given device, cause the given device to take an action. In some aspects, (1) the method further comprises, for each first question of a plurality of first questions: generating, using the conversational language model, a third question based on the second target response, the second question, the first target response, and the first question; generating, using the conversational language model, a third target response based on the third question, the second target response, the second question, the first target response, and the first question; submitting, using the one or more processors, a third action query to the conversational language model in response to the third target response; generating, using the conversational language model, a third target action recommendation based on the third action query, the third target response, the third question, the second target response, the second question, the first target response, and the first question; and generating, using the one or more processors, a triple-turn in-domain training example comprising the first question, the first target response, the second question, the second target response, the third question, the third target response, and the third target action recommendation; and (2) the training set further includes one or more of the triple-turn in-domain training examples. In some aspects, training the automated assistant based on the training set further comprises: (1) for each given triple-turn in-domain training example in the training set: generating, using the automated assistant, a third training response and a third training action recommendation based on the third question, the second target response, the second question, the first target response, and the first question of the given triple-turn in-domain training example; comparing, using the one or more processors, the third training response to the third target response of the given triple-turn in-domain training example to generate a fifth loss value; and comparing, using the one or more processors, the third training action recommendation to the third target action recommendation of the given triple-turn in-domain training example to generate a sixth loss value; and (2) modifying, using the one or more processors, one or more parameters of the automated assistant based at least in part on the generated fifth loss values and the generated sixth loss values. In some aspects, the third target action recommendation and the third training action recommendation both comprise one or more of: an indication of whether to take an action; an identification of an action to be taken; or instructions that, when executed by one or more processors of a given device, cause the given device to take an action. In some aspects, (1) the method further comprises, for each fourth question of a plurality of fourth questions: generating, using the one or more processors, a single-turn out-of-domain training example comprising the fourth question, a fourth target response, and a fourth target action recommendation, wherein the fourth target response indicates that an answer to the fourth question cannot be provided, and wherein the fourth target action recommendation indicates that no action is to be taken; generating, using the conversational language model, a fifth question based on the fourth target response and the fourth question; and generating, using the one or more processors, a double-turn out-of-domain training example comprising the fourth question, the fourth target response, the fifth question, a fifth target response, and a fifth target action recommendation, wherein the fifth target response indicates that an answer to the fifth question cannot be provided, and wherein the fifth target action recommendation indicates that no action is to be taken; and (2) the training set further includes one or more of the single-turn out-of-domain training examples, and one or more of the double-turn out-of-domain training examples. In some aspects, training the automated assistant based on the training set further comprises: (1) for each given single-turn out-of-domain training example in the training set: generating, using the automated assistant, a fourth training response and a fourth training action recommendation based on the fourth question of the given single-turn out-of-domain training example; comparing, using the one or more processors, the fourth training response to the fourth target response of the given single-turn out-of-domain training example to generate a seventh loss value; and comparing, using the one or more processors, the fourth training action recommendation to the fourth target action recommendation of the given single-turn out-of-domain training example to generate an eighth loss value; and (2) modifying, using the one or more processors, one or more parameters of the automated assistant based at least in part on the generated seventh loss values and the generated eighth loss values. In some aspects, training the automated assistant based on the training set further comprises: (1) for each given double-turn out-of-domain training example in the training set: generating, using the automated assistant, a fifth training response and a fifth training action recommendation based on the fifth question, the fourth target response, and the fourth question of the given double-turn out-of-domain training example; comparing, using the one or more processors, the fifth training response to the fifth target response of the given double-turn out-of-domain training example to generate a ninth loss value; and comparing, using the one or more processors, the fifth training action recommendation to the fifth target action recommendation of the given double-turn out-of-domain training example to generate a tenth loss value; and (2) modifying, using the one or more processors, one or more parameters of the automated assistant based at least in part on the generated ninth loss values and the generated tenth loss values. In some aspects, (1) the method further comprises, for each fourth question of a plurality of fourth questions: generating, using the conversational language model, a sixth question based on the fifth target response, the fifth question, the fourth target response, and the fourth question; and generating, using the one or more processors, a triple-turn out-of-domain training example comprising the fourth question, the fourth target response, the fifth question, the fifth target response, the sixth question, a sixth target response, and a sixth target action recommendation, wherein the sixth target response indicates that an answer to the sixth question cannot be provided, and wherein the sixth target action recommendation indicates that no action is to be taken; and (2) the training set further includes one or more of the triple-turn out-of-domain training examples. In some aspects, training the automated assistant based on the training set further comprises: (1) for each given triple-turn out-of-domain training example in the training set: generating, using the automated assistant, a sixth training response and a sixth training action recommendation based on the sixth question, the fifth target response, the fifth question, the fourth target response, and the fourth question of the given triple-turn out-of-domain training example; comparing, using the one or more processors, the sixth training response to the sixth target response of the given triple-turn out-of-domain training example to generate an eleventh loss value; and comparing, using the one or more processors, the sixth training action recommendation to the sixth target action recommendation of the given triple-turn out-of-domain training example to generate a twelfth loss value; and (2) modifying, using the one or more processors, one or more parameters of the automated assistant based at least in part on the generated eleventh loss values and the generated twelfth loss values. In some aspects, the method further comprises generating, using the one or more processors, one or more of the plurality of first questions based on one or more logs of questions asked by human users relating to a given device. In some aspects, the method further comprises generating, using the one or more processors, one or more of the plurality of fourth questions based on one or more logs of questions asked by human users not relating to the given device. In some aspects, training the automated assistant based on the training set results in the automated assistant being configured to provide information about the given device. In some aspects, the method further comprises generating, using the one or more processors, one or more of the plurality of first questions based on one or more queries that, when submitted to a given search engine, cause the search engine to return one or more webpages that mention a given device. In some aspects, the method further comprises generating, using the one or more processors, one or more of the plurality of fourth questions based on one or more queries that, when submitted to a given search engine, cause the search engine to return one or more webpages that do not mention the given device. In some aspects, training the automated assistant based on the training set results in the automated assistant being configured to provide information about the given device.

In another aspect, the disclosure describes a processing system comprising one or more processors configured to carry out any of the methods described above.

In another aspect, the disclosure describes a computer program product comprising computer readable instructions that, when executed by a computer, cause the computer to perform any of the methods described above.

In another aspect, the disclosure describes an automated assistant trained according to any of the methods described above. In some aspects, the automated assistant is resident on a first device, and configured to obtain information from a second device in order to generate responses to questions, the second device being remote from the first device.

BRIEF DESCRIPTION OF THE DRAWINGS

FIGS. 3A-3C are flow diagrams illustrating generation of exemplary single-turn in-domain training examples, in accordance with aspects of the disclosure.
FIGS. 4A and 4B are flow diagrams illustrating generation of exemplary double-turn in-domain training examples, in accordance with aspects of the disclosure.
FIGS. 5A and 5B are flow diagrams illustrating generation of exemplary triple-turn in-domain training examples, in accordance with aspects of the disclosure.
FIG. 7 is a flow diagram illustrating generation of an exemplary double-turn out-of-domain training example, in accordance with aspects of the disclosure.
FIG. 8 is a flow diagram illustrating generation of an exemplary triple-turn out-of-domain training example, in accordance with aspects of the disclosure.
FIG. 9 sets forth an exemplary method for generating single-turn in-domain training examples, in accordance with aspects of the disclosure.
FIG. 10 sets forth an exemplary method for training an automated assistant using a set of single-turn in-domain training examples generated according to the method of FIG. 9, in accordance with aspects of the disclosure.
FIG. 11 sets forth an exemplary method for generating double-turn in-domain training examples, in accordance with aspects of the disclosure.
FIG. 12 sets forth an exemplary method for training an automated assistant using a set of double-turn in-domain training examples generated according to the method of FIG. 11, in accordance with aspects of the disclosure.
FIG. 13 sets forth an exemplary method for generating triple-turn in-domain training examples, in accordance with aspects of the disclosure.
FIG. 14 sets forth an exemplary method for training an automated assistant using a set of triple-turn in-domain training examples generated according to the method of FIG. 13, in accordance with aspects of the disclosure.
FIG. 15 sets forth an exemplary method for generating single-turn out-of-domain training examples, in accordance with aspects of the disclosure.
FIG. 16 sets forth an exemplary method for training an automated assistant using a set of single-turn out-of-domain training examples generated according to the method of FIG. 15, in accordance with aspects of the disclosure.
FIG. 17 sets forth an exemplary method for generating double-turn out-of-domain training examples, in accordance with aspects of the disclosure.
FIG. 18 sets forth an exemplary method for training an automated assistant using a set of double-turn out-of-domain training examples generated according to the method of FIG. 17, in accordance with aspects of the disclosure.
FIG. 19 sets forth an exemplary method for generating triple-turn out-of-domain training examples, in accordance with aspects of the disclosure.

DETAILED DESCRIPTION

The present technology will now be described with respect to the following exemplary systems and methods.

Reference numbers in common between the figures depicted and described below are meant to identify the same features.

Example Systems

Figure 1:
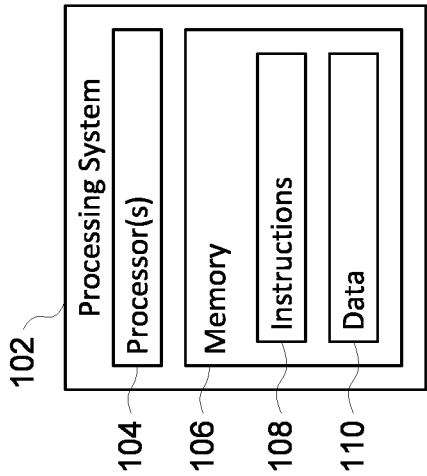
FIG. 1 is a functional diagram of an example system in accordance with aspects of the disclosure.

FIG. 1 shows a high-level system diagram 100 of an exemplary processing system 102 for performing the methods described herein. The processing system 102 may include one or more processors 104 and memory 106 storing instructions 108 and data 110. The instructions 108 and data 110 may include a conversational language model (e.g., conversational language model 302 of FIGS. 3-8, the conversational language model referenced in FIGS. 9, 11, 13, 15, 17, and 19, etc.) and/or an automated assistant (e.g., the automated assistant referenced in FIGS. 10-20). In addition, the data 110 may store training examples to be used in training the automated assistant (e.g., those used in pre-training, and/or those generated by the conversational language model), the responses and recommended actions generated by the automated assistant, and loss values generated during training of the automated assistant.

Processing system 102 may be resident on a single computing device. For example, processing system 102 may be a server, personal computer, or mobile device, and the conversational language model, automated assistant, and data associated with both may thus be local to that single computing device. Similarly, processing system 102 may be resident on a cloud computing system or other distributed system. In such a case, the conversational language model, automated assistant, and/or data associated with both may be distributed across two or more different physical computing devices. For example, in some aspects of the technology, the processing system may comprise a first computing device storing the conversational language model, and a second computing device storing the automated assistant and data used for training the automated assistant. In such cases, the second computing device may be one with a constrained memory space, e.g. a limited amount of memory for storing and running programs, and/or limited processing power. Likewise, in some aspects of the technology, the processing system may comprise a first computing device storing layers 1-n of a conversational language model having m layers, a second computing device storing layers n-m of the conversational language model, a third computing device storing the training examples generated by the conversational language model for use in training the automated assistant, and a fourth computing device (e.g., a personal computer, tablet, mobile phone) storing the automated assistant. Here as well, in such cases, the fourth computing device may be one with a constrained memory space, e.g. a limited amount of memory for storing and running programs, and/or limited processing power.

Figure 2:
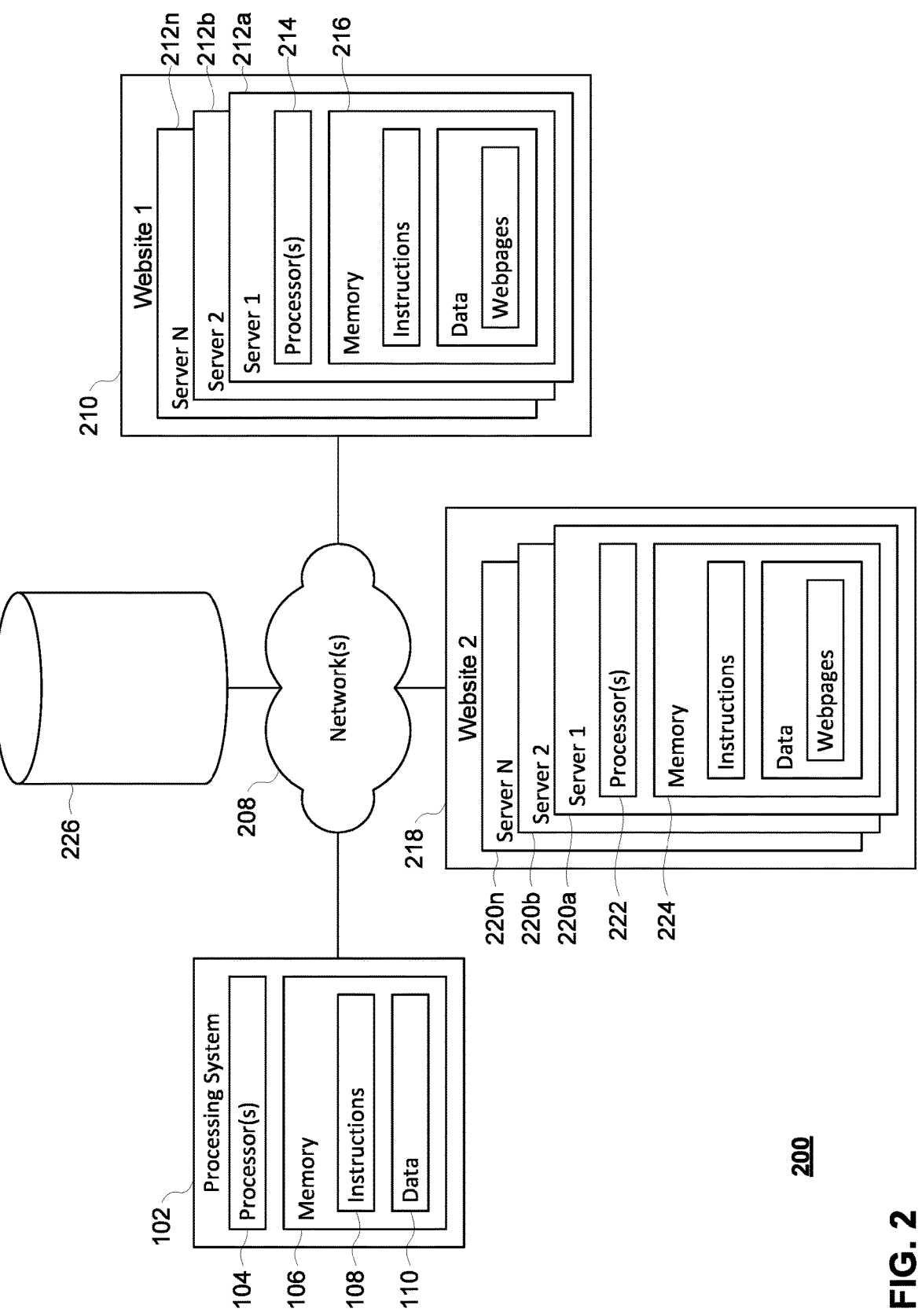
FIG. 2 is a functional diagram of an example system in accordance with aspects of the disclosure.

Further in this regard, FIG. 2 shows a high-level system diagram 200 in which the exemplary processing system 102 just described is shown in communication with various websites and/or remote storage systems over one or more networks 208, including websites 210 and 218 and remote storage system 226. In this example, websites 210 and 218 each include one or more servers 212a-212n and 220a-220n, respectively. Each of the servers 212a-212n and 220a-220n may have one or more processors (e.g., 214 and 222), and associated memory (e.g., 216 and 224) storing instructions and data, including the content of one or more webpages. Likewise, although not shown, remote storage system 226 may also include one or more processors and memory storing instructions and data. In some aspects of the technology, the processing system 102 may be configured to retrieve data from one or more of website 210, website 218, and/or remote storage system 226, for use in training the automated assistant. For example, in some aspects, the processing system 102 may be configured to retrieve training examples from remote storage system 226 for use in pre-training or training of the automated assistant. In addition, in some aspects, the automated assistant may be configured to retrieve information from one or more websites (e.g., website 210, website 218) when formulating responses or recommended actions, for example as described in U.S. Pat. No. 11,003,865, which is incorporated by reference herein in its entirety.

The processing systems described herein may be implemented on any type of computing device(s), such as any type of general computing device, server, or set thereof, and may further include other components typically present in general purpose computing devices or servers. Likewise, the memory of such processing systems may be of any non-transitory type capable of storing information accessible by the processor(s) of the processing systems. For instance, the memory may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Example Methods

Figure 3A:
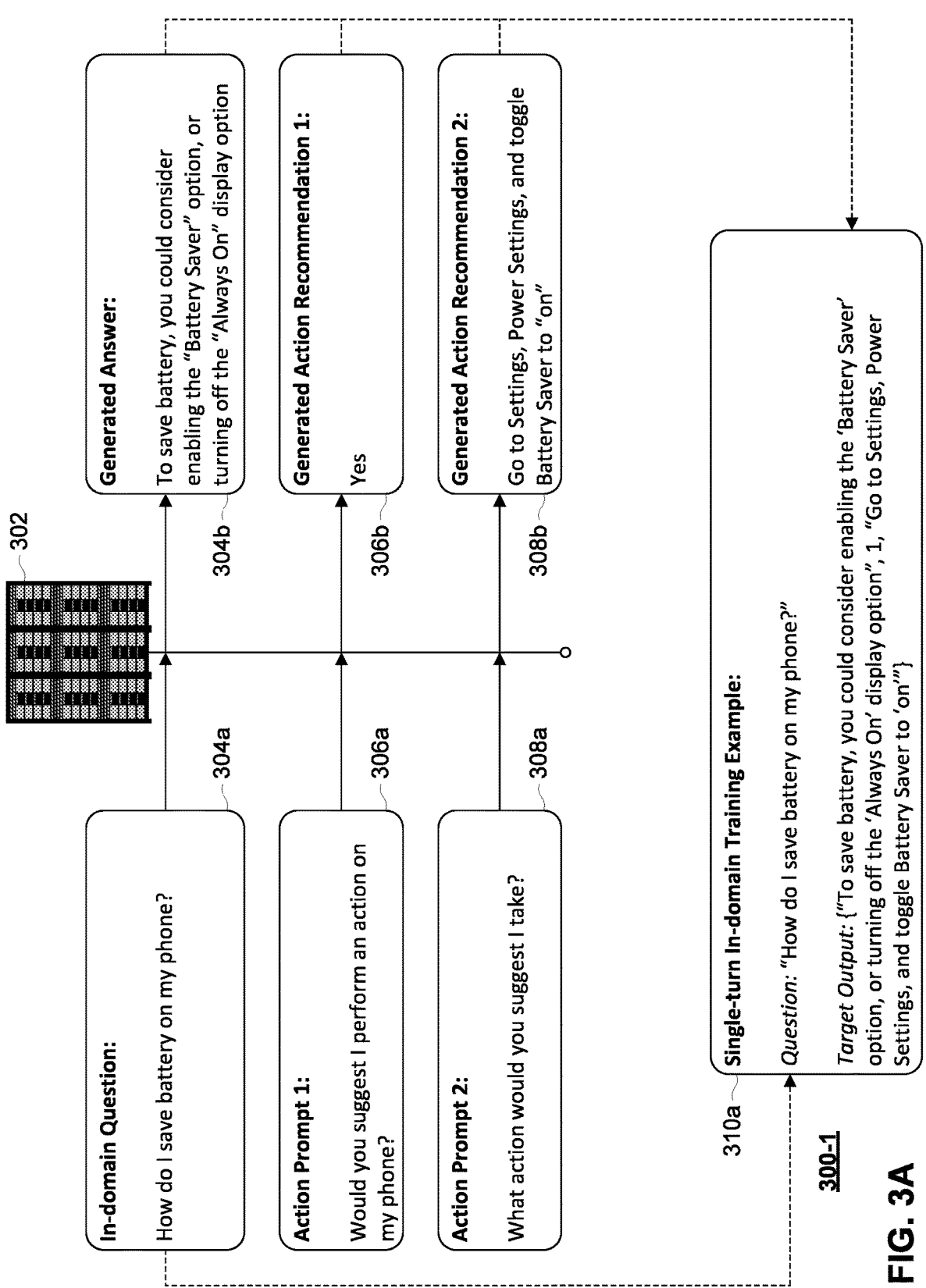

FIGS. 3A-3C show flow diagrams (300-1, 300-2, 300-3) illustrating generation of exemplary single-turn in-domain training examples (310a, 310b, 310c), in accordance with aspects of the disclosure.

In each of the exemplary flows 300-1, 300-2, and 300-3, it is assumed that a processing system (not shown) will submit a selected in-domain question to a conversational language model 302. In each of FIGS. 3A-3C, this first question 304a asks "How do I save battery on my phone?" This initial in-domain question 304a may be derived from any suitable source(s). For example, in some aspects of the technology, an in-domain question may be selected from a curated set of questions that have been identified as being related to a particular topic. Thus, where the "domain" has to do with the features of a particular phone (as exemplary in-domain question 304a does), a set of in-domain questions may be compiled from logs of questions that were actually asked by users of the phone (or another similar phone or device) in online chats, calls to technical support, queries submitted to search engines that mention or generate hits relating to the particular phone, etc. Moreover, the set of in-domain questions may be created or curated by humans (e.g., after reviewing such logs) or by heuristic or learned models configured to identify questions regarding the given topic (e.g., based on the existence of various words in a given question, an answer to a given question, search results returned in response to a given question, etc.).

In each of FIGS. 3A-3C, once the exemplary in-domain question 304a has been selected, it is submitted to a conversational language model 302, which then generates an answer to the question. In these examples, the generated answer 304b is assumed to be "To save battery, you could consider enabling the 'Battery Saver' option, or turning off the 'Always On' display option." Although not shown in the examples of FIGS. 3A-3C, in some aspects of the technology, the processing system may be further configured to submit the exemplary in-domain question 304a to the conversational language model 320 along with some amount of predetermined conversational history. For example, in some aspects, the conversational language model 302 may receive a conversation history that includes a predetermined first introductory question of "Hi, who are you?" and a predetermined first response of "I am your automated phone expert," and the language model will then formulate the generated answer 304b based on the exemplary in-domain question 304a and this conversational history. In addition, although the examples of FIGS. 3A-3C each show the conversational language model 302 generating a single generated answer 304b, in some aspects of the technology, the conversational language model 302 may be configured to generate two or more candidate responses to any given response. In such a case, the processing system may then be further configured to choose one of those candidate responses to be the generated answer 304b, and may be configured to do so based on any suitable criteria (e.g., confidence scores associated with each candidate response, these scores being generated by the conversational language model 302 or another heuristic or learned model). Likewise, in cases where the conversational language model 302 generates two or more candidate responses, the processing system may be further configured to generate separate training examples from each candidate response, and may also optionally include a confidence score (e.g., a confidence score generated by the conversational language model 302 for each candidate response) in each training example so that those with higher confidence scores may be weighted more heavily when used to train another model (e.g., an automated assistant).

Conversational language model 302 may be any suitable type of language model that has been optimized for conversation. In some aspects of the technology, the conversational language 302 model may be a neural network, such as a recurrent neural network and/or a transformer network, configured to receive natural language (e.g. speech and/or text) as input and generate a natural language output based on the input. For example, conversational language model 302 may be a very large language model (e.g., LaMDA, GPT-3) that is pre-trained on a large corpus of content (e.g., data obtained from one or more websites, such as the Common Crawl repository) and then fine-tuned on dialogue data (e.g., existing dialogue training datasets, chat logs, etc.). In addition, in some aspects of the technology, where the conversational language model 302 will be used to generate training data for an automated assistant (e.g., as described below with respect to FIGS. 9-20), the conversational language model 302 may be further fine-tuned on a corpus of domain-specific data related to the subject(s) about which the automated assistant will be expected to field questions.

In each of FIGS. 3A-3C, once the conversational language model 302 has generated an answer 304b to the initial in-domain question 304a, the processing system will submit a follow-up question designed to elicit an action recommendation from the conversational language model 302. This action prompt may be any suitable type of question directed to whether any particular action would be related to the first question 304a or generated answer 304b, whether an action would make sense in view of the first question 304a or generated answer 304b, what that action would be, etc. Thus, in the examples of FIGS. 3A-3C, the processing system begins by submitting a first action prompt 306a to the conversational language model 302 asking "Would you suggest I perform an action on my phone?" However, any other suitable type of action prompt may be used. For example, in some aspects of the technology, the question may request a certain format to be used, such as "Would you suggest I perform an action on my phone? Respond 1 if yes, and 0 if no."

In the examples of FIGS. 3A-3C, 4A, 4B, 5A, 5B, and 6-8, it is assumed that the conversational language model 302 is configured to generate responses based not only on the present question, but also based on the context of the conversation. Thus, in the examples of FIGS. 3A-3C, the conversational language model will generate its first action recommendation based on the first action prompt 306a, as well as the original in-domain question 304a and its own prior response thereto (generated response 304b). To illustrate different possible outcomes, in the examples of FIGS. 3A and 3B, it is assumed that the conversational language model 302 returns a first generated action recommendation 306b of "yes," while in the example of FIG. 3C it is assumed that the conversational language model 302 returns a first generated action recommendation 306c of "no." Where a given training example only includes an indication of whether an action is recommended, but not what action is to be recommended, that example will only train the automated assistant whether an action is recommended. In some aspects of the technology, the automated assistant may be configured to invoke a separate heuristic or learned utility whenever it determines that an action is suggested, and that separate utility may be configured to suggest a particular action based on its own review of the conversation history. In such cases, the separate utility may also be further configured to generate prompts to the user regarding the identified action (e.g., asking whether the user wishes to take the identified action).

In addition, in some cases, the processing system may be configured to pose one or more follow-up action prompts. For example, the processing system may be configured to ask a follow-up action prompt where the prior action recommendation indicated that an action was to be taken (e.g., based on the prior action recommendation being a "yes" or a "1"). To illustrate this, in the example of FIG. 3A, it is assumed that the processing system is configured to submit a second action prompt 308a asking "What action would you suggest I take?" and that the conversational language model 302 will generate a second action recommendation 308b of "Go to Settings, Power Settings, and toggle Battery Saver to 'on.'" Here as well, this follow-up action prompt may be any suitable type of question directed to eliciting further information about a prior recommended action, and may specify a particular format to be used. Thus, in some aspects of the technology, the follow-up action prompt may specify that the response should indicate the desired action by identifying a particular object to be called, such as "What is the JavaScript Object Notation for the action that you suggest taking?"

As shown by the dashed lines in each of FIGS. 3A-3C, the processing system will use the initial in-domain question (304a), and the conversational language model 302's answer (304b) and action recommendation(s) (306b, 306c, 308b) to generate different potential single-turn in-domain training examples (310a, 310b, 310c). As discussed further below (e.g., in FIGS. 9, 10), the resulting single-turn in-domain training examples may then be used (by themselves, or together with double-turn, triple-turn, or any other suitable degree of in-domain training examples, and/or with out-of-domain training examples) to train a separate automated assistant to answer questions and suggest actions in response to similar questions. Thus, in FIG. 3A, the single-turn in-domain training example 310a includes a copy of the initial question 304a, and a target output including a copy of the generated answer 304b, a "1" to indicate that an action was recommended by the conversational language model 302 (in response to action prompt 306b), and a copy of the second action recommendation 308b. FIG. 3B shows a less detailed single-turn in-domain training example 310b which only includes a copy of the initial question 304a, and a target output including a copy of the generated answer 304b and a "1" to indicate that an action was recommended by the conversational language model 302 (in response 306b). Likewise, FIG. 3C shows a single-turn in-domain training example 310c similar in format to single-turn in-domain training example 310b of FIG. 3B, but in which the target output instead includes a "0" to indicate that an action was not recommended by the conversational language model 302

(in response to action prompt 306c). In each of these examples, it is assumed that the processing system is configured to convert the "yes" or "no" of the first generated action recommendation (306b, 306c) into a "1" or "0," respectively. However, in some aspects of the technology, the processing system may instead be configured to simply include the content of each generated action recommendation into the resulting training example without modification. Moreover, as noted above, in some aspects of the technology, the processing system may be configured to ask the conversational language model 302 to specify a 1 or 0 (or other desired indicator) in its generated action recommendation.

FIGS. 4A and 4B are flow diagrams (400-1, 400-2) illustrating generation of exemplary double-turn in-domain training examples (410a, 410b), in accordance with aspects of the disclosure. For simplicity, the exemplary flows 400-1 and 400-2 show how a double-turn in-domain training example may be generated based on the question (304a) and answer (304b) of FIGS. 3A-3C.

Thus, in FIGS. 4A and 4B, the processing system provides an original conversation history 402a to the conversational language model 302. As shown, the original conversation history 402a includes: a first question (Q1) of "How do I save battery on my phone?" (the same as the initial in-domain question 304a of FIGS. 3A-3C); and a first answer (A1) of "To save battery, you could consider enabling the 'Battery Saver' option, or turning off the 'Always On' display option" (the same as the generated answer 304b of FIGS. 3A-3C). Although the exemplary flows of FIGS. 4A and 4B build off of the question and answer of FIGS. 3A-3C, the original conversation history 402a may include any suitable in-domain question and answer from any suitable source. For example, in some aspects of the technology, the first question and first answer may be harvested from a chat log, and the processing system may then use the conversational language model 302 to generate a second question and second answer in order to generate a double-turn in-domain training example.

Based on the first question and first answer of the original conversation history 402a, the conversational language model 302 generates a follow-up question, shown in FIGS. 4A and 4B as generated second question 402b. The conversational language model 302 may generate this second question 402b in any suitable way, such as based on heuristic programming or accrued knowledge regarding how conversations generally flow, and/or specific information it has learned or retrieved regarding the "domain" of the first question and first answer. Thus, in the example of FIGS. 4A and 4B, it is assumed that the conversational language model 302 generates a second question 402b of "Where can I find the 'Battery Saver' option?"

The processing system combines the original conversation history 402a with the generated second question 402b to form an updated conversation history 404a. That updated conversation history 404a is then provided to the conversational language model 302 for generation of a second answer 404b. Again, it is assumed that the conversational language model 302 is configured to generate responses based not only on the present question, but also based on the context of the conversation. Thus, the conversational language model 302 will generate this second answer 404b in response to the second question (Q2 of 404a), but also in view of the first question (Q1 of 404a/402a) and the first answer (A1 of 404a/402a). Thus, in the examples of FIGS. 4A and 4B, it is assumed that the conversational language model 302 generates an answer 404*b* of "It is in the Settings menu under 'Power Settings.'"

As with FIGS. 3A-3C, once the conversational language model 302 has generated a second answer 404*b* to the updated conversation history 404*a*, the processing system will submit one or more follow-up questions designed to elicit one or more action recommendations from the conversational language model 302. Again, these action prompts may include any suitable type of question directed to whether any particular action would be related to the second question (Q2 of 404*a*) or second answer 404*b*, whether an action would make sense in view of the second question (Q2 of 404*a*) or second answer 404*b*, what that action would be, etc. Thus, while the action prompt may include any of the options already described, for simplicity it is assumed that the processing system will again submit a first action prompt 406*a* to the conversational language model 302 asking "Would you suggest I perform an action on my phone?" Here as well, the conversational language model will generate its first action recommendation based on the first action prompt 406*a*, as well as the first question (Q1 of 404*a*/402*a*), first answer (A1 of 404*a*/402*a*), second question (Q2 of 404*a*), and second answer (404*b*).

To illustrate different options, the example of FIG. 4A assumes that two action prompts will be submitted, while the example of FIG. 4B assumes only one action prompt. Thus, in FIGS. 4A and 4B, it is assumed that the conversational language model 302 returns a first generated action recommendation 406*b* of "yes." However, in FIG. 4A, it is further assumed that the processing system then submits a second action prompt 408*a* asking "What action would you suggest I take?" and that the conversational language model 302 generates a second action recommendation 408*b* of "Go to Settings, Power Settings, and toggle Battery Saver to 'on.'" Here as well, these action prompts may be any suitable type of question directed to eliciting further information about a prior recommended action, and may specify a particular format to be used.

As shown by the dashed lines in FIGS. 4A and 4B, the processing system will use the updated conversation history 404*a*, and the conversational language model 302's second answer (404*b*) and action recommendation(s) (406*b*, 408*b*) to generate different potential double-turn in-domain training examples (410*a*, 410*b*). As discussed further below (e.g., in FIGS. 11, 12), the resulting double-turn in-domain training examples may then be used (by themselves, or together with single-turn, triple-turn, or any other suitable degree of in-domain training examples, and/or with out-of-domain training examples) to train a separate automated assistant to answer questions and suggest actions in response to similar questions. Thus, in FIG. 4A, the double-turn in-domain training example 410*a* includes a copy of the updated conversation history 404*a* (including a first question, first answer, and second question), and a target output including a copy of the generated second answer 404*b*, a "1" to indicate that an action was recommended by the conversational language model 302 (in response to action prompt 406*b*), and a copy of the second action recommendation 408*b*. FIG. 4B shows a less detailed double-turn in-domain training example 410*b* that only includes a copy of the updated conversation history 404*a*, and a target output including a copy of the generated second answer 404*b* and a "1" to indicate that an action was recommended by the conversational language model 302 (in response to action prompt 406*b*). As above, in both of these examples, it is assumed that the processing system is configured to convert the "yes" or "no" of the first generated action recommendation (406*b*) into a "1" or "0," respectively. However, in some aspects of the technology, the processing system may instead be configured to simply include the content of each generated action recommendation into the resulting training example without modification, and/or to ask the conversational language model 302 to specify a 1 or 0 (or other desired indicator) in its generated action recommendation.

FIGS. 5A and 5B are flow diagrams (500-1, 500-2) illustrating generation of exemplary triple-turn in-domain training examples (510*a*, 510*b*), in accordance with aspects of the disclosure. For simplicity, the exemplary flows 500-1 and 500-2 show how a triple-turn in-domain training example may be generated based on the question (304*a*) and answer (304*b*) of FIGS. 3A-3C, and the second question (402*b*) and second answer (404*b*) of FIGS. 4A and 4B.

Thus, in FIGS. 5A and 5B, the processing system provides an original conversation history 502*a* to the conversational language model 302. As shown, the original conversation history 502*a* includes: a first question (Q1) of "How do I save battery on my phone?" (the same as the initial in-domain question 304*a* of FIGS. 3A-3C); a first answer (A1) of "To save battery, you could consider enabling the 'Battery Saver' option, or turning off the 'Always On' display option" (the same as the generated answer 304*b* of FIGS. 3A-3C); a second question (Q2) of "Where can I find the 'Battery Saver' option?" (the same as the generated second question 402*b* of FIGS. 4A and 4B); and a second answer (A2) of "It is in the Settings menu under 'Power Settings'" (the same as the generated second answer 404*b* of FIGS. 4A and 4B). Here as well, although the exemplary flows of FIGS. 5A and 5B build off of the questions and answers of FIGS. 3A-3C, 4A, and 4B, the original conversation history 502*a* may include any suitable in-domain double-turn conversation from any suitable source. For example, in some aspects of the technology, the first question and first answer may be harvested from a chat log, and the processing system may then use the conversational language model 302 to generate a second question and second answer (as discussed in FIGS. 4A and 4B) to generate a double-turn conversation on which the flows of FIGS. 5A and 5B may be based. Likewise, in some aspects of the technology, the first question, first answer, second question, and second answer may all be harvested from a chat log, and the processing system may then use the conversational language model 302 to generate a third question and third answer in order to generate a triple-turn in-domain training example.

Based on the first question, first answer, second question, and second answer of the original conversation history 502*a*, the conversational language model 302 generates a follow-up third question 502*b*. Here as well, the conversational language model 302 may generate this third question 502*b* in any suitable way, such as based on heuristic programming or accrued knowledge regarding how conversations generally flow, and/or specific information it has learned or retrieved regarding the "domain" of the first question and first answer. Thus, in the example of FIGS. 5A and 5B, it is assumed that the conversational language model 302 generates a third question 502*b* of "Can you please take me there?"

The processing system combines the original conversation history 502*a* with the generated third question 502*b* to form an updated conversation history 504*a*. That updated conversation history 504*a* is then provided to the conversational language model 302 for generation of a third answer 504*b*. Again, it is assumed that the conversational language model 302 is configured to generate responses based not only on the present question, but also based on the context of the conversation. Thus, the conversational language model 302 will generate this third answer 504*b* in response to the third question (Q3 of 504*a*), but also in view of the second answer (A2 of 504*a*/502*a*), the second question (Q2 of 504*a*/502*a*), the first question (Q1 of 504*a*/502*a*), and the first answer (A1 of 504*a*/502*a*). Thus, in the examples of FIGS. 5A and 5B, it is assumed that the conversational language model 302 generates an answer 504*b* of "Yes, I will do that now."

As with FIGS. 3A-3C, 4A, and 4B, once the conversational language model 302 has generated a third answer 504*b* to the updated conversation history 504*a*, the processing system will submit one or more follow-up questions designed to elicit one or more action recommendations from the conversational language model 302. Again, these action prompts may include any suitable type of question directed to whether any particular action would be related to the third question (Q3 of 504*a*) or third answer 504*b*, whether an action would make sense in view of the third question (Q3 of 504*a*) or third answer 504*b*, what that action would be, etc. Thus, while the action prompt may include any of the options already described, for simplicity it is assumed that the processing system will again submit a first action prompt 506*a* to the conversational language model 302 asking "Would you suggest I perform an action on my phone?" Here as well, the conversational language model will generate its first action recommendation based on the first action prompt 506*a*, as well as the first question (Q1 of 504*a*/502*a*), first answer (A1 of 504*a*/502*a*), the second question (Q2 of 504*a*/502*a*), second answer (A2 of 504*a*/502*a*), third question (Q3 of 504*a*), and third answer (504*b*).

Here as well, to illustrate different options, the example of FIG. 5A assumes that two action prompts will be submitted, while the example of FIG. 5B assumes only one action prompt. Thus, in FIGS. 5A and 5B, it is assumed that the conversational language model 302 returns a first generated action recommendation 506*b* of "yes." However, in FIG. 5A, it is further assumed that the processing system then submits a second action prompt 508*a* asking "What action would you suggest I take?" and that the conversational language model 302 generates a second action recommendation 508*b* of "Go to Settings, Power Settings." As above, these action prompts may be any suitable type of question directed to eliciting further information about a prior recommended action, and may specify a particular format to be used.

As shown by the dashed lines in FIGS. 5A and 5B, the processing system will use the updated conversation history 504*a*, and the conversational language model 302's third answer (504*b*) and action recommendation(s) (506*b*, 508*b*) to generate different potential triple-turn in-domain training examples (510*a*, 510*b*). As discussed further below (e.g., in FIGS. 13, 14), the resulting triple-turn in-domain training examples may then be used (by themselves, or together with single-turn, double-turn, or any other suitable degree of in-domain training examples, and/or with out-of-domain training examples) to train a separate automated assistant to answer questions and suggest actions in response to similar questions. Thus, in FIG. 5A, the triple-turn in-domain training example 510*a* includes a copy of the updated conversation history 504*a* (including a first question, first answer, second question, second answer, and third question), and a target output including a copy of the generated third answer 504*b*, a "1" to indicate that an action was recommended by the conversational language model 302 (in response to action prompt 506*b*), and a copy of the third action recommendation 508*b*. FIG. 5B shows a less detailed triple-turn in-domain training example 510*b* that only includes a copy of the updated conversation history 504*a*, and a target output including a copy of the generated second answer 504*b* and a "1" to indicate that an action was recommended by the conversational language model 302 (in response to action prompt 506*b*). As above, in both of these examples, it is assumed that the processing system is configured to convert the "yes" or "no" of the first generated action recommendation (506*b*) into a "1" or "0," respectively. However, in some aspects of the technology, the processing system may instead be configured to simply include the content of each generated action recommendation into the resulting training example without modification, and/or to ask the conversational language model 302 to specify a 1 or 0 (or other desired indicator) in its generated action recommendation.

Figure 6:
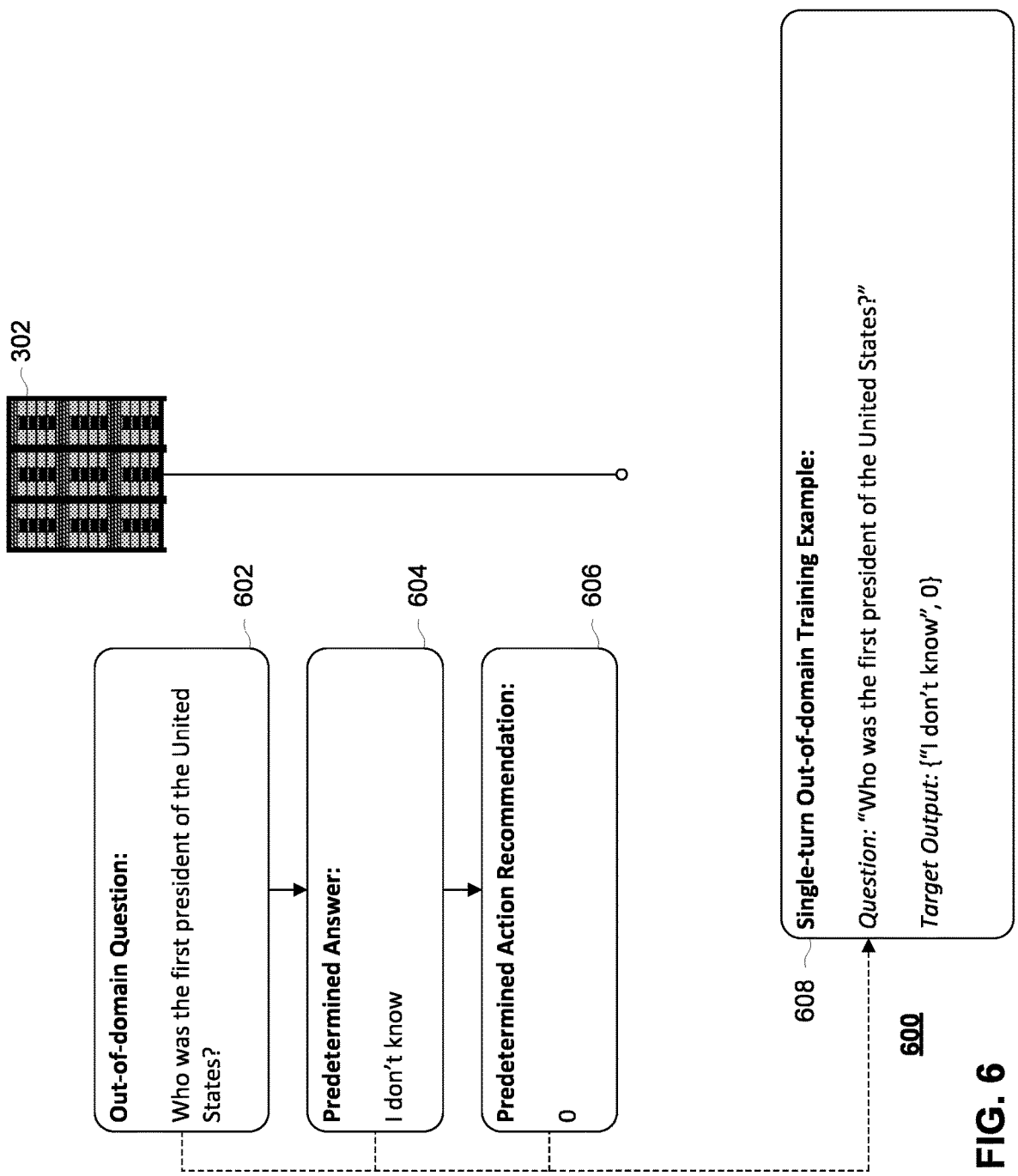
FIG. 6 is a flow diagram illustrating generation of an exemplary single-turn out-of-domain training example, in accordance with aspects of the disclosure.

FIG. 6 is a flow diagram 600 illustrating generation of an exemplary single-turn out-of-domain training example 608, in accordance with aspects of the disclosure.

In the example of FIG. 6, it is assumed that flow 600 will begin with a processing system (not shown) selecting an out-domain question 602 which asks "Who was the first president of the United States?" As was the case with FIGS. 3A-3B, this initial out-of-domain question 602 may be derived from any suitable source(s). For example, in some aspects of the technology, an out-of-domain question may be from a set of questions randomly harvested from queries submitted to search engines, logs of questions that were actually asked by people in online chats, etc. In addition, in some cases, the set of randomly selected questions may be further filtered to remove any questions that are identified as being unrelated to a particular topic. Thus, where the "domain" has to do with the features of a particular phone (as exemplary in-domain question 304*a* does), the random set of out-of-domain questions may be filtered to remove any questions that mention the phone (or another similar phone or device), or that would generate hits on the particular phone when submitted to search engines, etc. Moreover, this filtering may be done by humans, or by heuristic or learned models configured to identify questions regarding topics related to the given domain (e.g., based on the existence of various words in a given question, an answer to a given question, search results returned in response to a given question, etc.).

Once the exemplary out-of-domain question 602 has been selected, the processing system will automatically generate a predetermined answer 604 and a predetermined action recommendation 606. In the example of FIG. 6, it is assumed that the predetermined answer 604 is "I don't know," and the predetermined action recommendation 606 is "0." However, predetermined answer 604 may be any suitable response that indicates that an answer to the question cannot or will not be provided, such as "I cannot answer that." In addition, in some aspects of the technology, predetermined answer 604 may be an indicator or tag such as "0" or "<UNK>" that the automated assistant may be trained to reproduce. In such cases, another utility (e.g., on the automated assistant) may be configured to replace such indicator or tag with a response randomly selected from a list of different responses so that the automated assistant does not repeat the same response for all out-of-domain questions. Likewise, predetermined action recommendation 606 may be any suitable response that indicates that no action is to be taken in response to the out-of-domain question 602, such as "no," "none," "<NULL>," etc.

Here as well, as shown by the dashed lines, the processing system will use the initial out-of-domain question 602, the predetermined answer 604, and the predetermined action recommendation 606 to generate a single-turn out-of-domain training example 608. Thus, the single-turn out-of-domain training example 608 includes a copy of the initial question 602, and a target output including a copy of the predetermined answer 604 and predetermined action recommendation 606 (a "0" to indicate that no action is recommended). As discussed further below (e.g., in FIGS. 15, 16), a set of similar single-turn out-of-domain training examples may be used (by themselves, or together with double-turn, triple-turn, or any other suitable degree of out-of-domain training examples, and/or with in-domain training examples) to train a separate automated assistant to answer questions and suggest actions in response to similar questions.

FIG. 7 is a flow diagram 700 illustrating generation of an exemplary double-turn out-of-domain training example 708, in accordance with aspects of the disclosure. For simplicity, the exemplary flow 700 shows how a double-turn out-of-domain training example may be generated based on the question (602) and answer (604) of FIG. 6.

Thus, in FIG. 7, the processing system provides a conversation history 702a to the conversational language model 302. As shown, the conversation history 702a includes: a first question (Q1) of "Who was the first president of the United States?" (the same as the initial out-of-domain question 602 of FIG. 6); and a first answer (A1) of "I don't know" (the same as the predetermined answer 604 of FIG. 6). Based on this first question and first answer of the conversation history 702a, the conversational language model 302 generates a follow-up second question 702b. Here as well, the conversational language model 302 may generate this second question 702b in any suitable way, such as based on heuristic programming or accrued knowledge regarding how conversations generally flow, and/or specific information it has learned or retrieved regarding the subject of the first question and first answer. Thus, in the example of FIG. 7, it is assumed that the conversational language model 302 generates a second question 702b of "Do you know whether it may have been George Washington?"

Once the second question 702b has been generated, the processing system will automatically generate a predetermined second answer 704 and a predetermined second action recommendation 706. Here again, it is assumed that the predetermined second answer 704 is "I don't know," and the predetermined second action recommendation 706 is "0." However, as above, the predetermined second answer 704 may be any suitable response that indicates that an answer to the second question 702b cannot or will not be provided, such as "I cannot answer that," or an indicator or tag such as "0" or "<UNK>." Likewise, the predetermined second action recommendation 706 may be any suitable response that indicates that no action is to be taken in response to the second question 702b, such as "no," "none," "<NULL>," etc.

Here as well, as shown by the dashed lines, the processing system will use the conversation history 702a, the generated second question 702b, the predetermined second answer 704, and the predetermined second action recommendation 706 to generate a double-turn out-of-domain training example 708. Thus, the double-turn out-of-domain training example 708 includes a copy of the conversation history 702a (including a first question and first answer), a copy of the generated second question 702b, and a target output including a copy of the predetermined second answer 704 and the predetermined second action recommendation 706 (a "0" to indicate that no action is recommended). As discussed further below (e.g., in FIGS. 17, 18), a set of similar double-turn out-of-domain training examples may be used (by themselves, or together with single-turn, triple-turn, or any other suitable degree of out-of-domain training examples, and/or with in-domain training examples) to train a separate automated assistant to answer questions and suggest actions in response to similar questions.

FIG. 8 is a flow diagram 800 illustrating generation of an exemplary triple-turn out-of-domain training example 808, in accordance with aspects of the disclosure. For simplicity, the exemplary flow 800 shows how a triple-turn out-of-domain training example may be generated based on the question (602) and answer (604) of FIG. 6, and the second question (702b) and second answer (704) of FIG. 7.

Thus, in FIG. 8, the processing system provides a conversation history 802a to the conversational language model 302. As shown, the conversation history 802a includes: a first question (Q1) of "Who was the first president of the United States?" (the same as the initial out-of-domain question 602 of FIG. 6); a first answer (A1) of "I don't know" (the same as the predetermined answer 604 of FIG. 6); a second question (Q2) of "Do you know whether it may have been George Washington?" (the same as the generated second question 702b of FIG. 7); and a second answer (A2) of "I don't know" (the same as the predetermined answer 704 of FIG. 7). Based on this first question, first answer, second question, and second answer of the conversation history 802a, the conversational language model 302 generates a follow-up third question 802b. Here as well, the conversational language model 302 may generate this third question 802b in any suitable way, such as based on heuristic programming or accrued knowledge regarding how conversations generally flow, and/or specific information it has learned or retrieved regarding the subject of the first question and first answer. Thus, in the example of FIG. 8, it is assumed that the conversational language model 302 generates a third question 802b of "Do you know who the second president of the United States was?"

Once the third question 802b has been generated, the processing system will automatically generate a predetermined third answer 804 and a predetermined third action recommendation 806. Here again, it is assumed that the predetermined third answer 804 is "I don't know," and the predetermined third action recommendation 806 is "0." However, as above, the predetermined third answer 804 may be any suitable response that indicates that an answer to the third question 802b cannot or will not be provided, such as "I cannot answer that," or an indicator or tag such as "0" or "<UNK>." Likewise, the predetermined third action recommendation 806 may be any suitable response that indicates that no action is to be taken in response to the third question 802b, such as "no," "none," "<NULL>," etc.

Here as well, as shown by the dashed lines, the processing system will use the conversation history 802a, the generated third question 802b, the predetermined third answer 804, and the predetermined third action recommendation 806 to generate a triple-turn out-of-domain training example 808. Thus, the triple-turn out-of-domain training example 808 includes a copy of the conversation history 802a (including a first question, first answer, second question, and second answer), a copy of the generated third question 802b, and a target output including a copy of the predetermined third answer 804 and the predetermined third action recommendation 806 (a "0" to indicate that no action is recommended). As discussed further below (e.g., in FIGS. 19, 20), a set of similar triple-turn out-of-domain training examples may be used (by themselves, or together with single-turn, double-turn, or any other suitable degree of out-of-domain training examples, and/or with in-domain training examples) to train a separate automated assistant to answer questions and suggest actions in response to similar questions.

FIG. 9 sets forth an exemplary method 900 for generating single-turn in-domain training examples, in accordance with aspects of the disclosure. In that regard, method 900 may be used to generate single-turn in-domain training examples similar to those shown and described with respect to FIGS. 3A-3C.

In step 902, a processing system (e.g., processing system 102) selects a first question (e.g., initial in-domain question 304a of FIGS. 3A-3C) of a plurality of first questions. As with FIGS. 3A-3C, this first question may be selected from any suitable plurality of first questions that have been identified as being related to a particular topic. Thus, where the "domain" has to do with the features of a particular phone, the plurality of first questions may be compiled from logs of questions that were actually asked by users of the phone (or another similar phone or device) in online chats, calls to technical support, queries submitted to search engines that mention or generate hits on the particular phone, etc. Moreover, the plurality of first questions may be created or curated by humans (e.g., after reviewing such logs) or by heuristic or learned models configured to identify questions regarding the given topic (e.g., based on the existence of various words in a given question, an answer to a given question, search results returned in response to a given question, etc.).

In step 904, the processing system uses a conversational language model (e.g., conversational language model 302) to generate a first target response (e.g., generated answer 304b of FIGS. 3A-3C) based on the first question. This first target response may be any suitable type of response to the first question, such as an answer, a request for further information, etc. Here as well, the conversational language model may be any suitable type of language model that has been optimized for conversation, such as a very large language model (e.g., LaMDA, GPT-3) that is pre-trained on a large corpus of content (e.g., data obtained from one or more websites, such as the Common Crawl repository) and then fine-tuned on dialogue data (e.g., existing dialogue training datasets, chat logs, etc.). In addition, the conversational language model may be further fine-tuned on a corpus of domain-specific data related to the subject(s) about which the automated assistant will be expected to field questions.

In step 906, the processing system submits a first action query (e.g., first action prompt 306a and/or second action prompt 308a of FIGS. 3A-3C) to the conversational language model in response to the first target response. This first action query may be any suitable type of question directed to whether any particular action would be related to the first question or the first target response, whether an action would make sense in view of the first question or the first target response, what that action would be, etc. For example, the first action query may include any of the options described above with respect to the first action prompt 306a and the second action prompt 308a of FIGS. 3A-3C.

Although in the exemplary method 900 of FIG. 9 it is assumed that the processing system will submit a first action query to the conversational language model in response to the first action prompt, in some aspects of the technology, steps 906 and 908 may be omitted, and the resulting single-turn in-domain training example may include only the first question (selected in step 902) and the first target response (generated in step 904). For example, in some aspects of the technology, the domain may be one in which responsive actions are undesirable or unlikely to be useful, and thus the conversational language model may not be asked to generate a target action recommendation. In such a case, the training examples may be used to train an automated assistant or other model to simply respond to the questions in a manner consistent with the conversational language model's responses, but without necessarily making action recommendations. Likewise, the exemplary methods 1100, 1300, 1500, 1700, and 1900 of FIGS. 11, 13, 15, 17, and 19 may be similarly modified in order to generate other types and degrees of training examples that include questions and target responses, but no target action recommendations.

In step 908, the processing system uses the conversational language model to generate a first target action recommendation (e.g., first generated action recommendation 306b and/or second generated action recommendation 308b of FIGS. 3A-3C) based on the first action query, the first target response, and the first question. This first target action recommendation may be any suitable type of response, including any of the options described above with respect to the first generated action recommendation 306b and second generated action recommendation 308b of FIGS. 3A-3C. Thus, in some aspects, the first target action recommendation may be a "yes," a "no," a "0," a "1," a statement identifying specific action to be taken, an identifier for a particular file or object (e.g., a link, a filename, an object identified in JSON format) to be used in order to take an action, etc. In addition, as described above, the first target action recommendation may be a copy of the output of the conversational language model in response to the first action query, or the processing system may generate the first target action recommendation based on the output of the conversational language model. For example, in some aspects of the technology, where the conversational language model outputs a "yes" in response to the first action query, the processing system may be configured to generate a first target action recommendation of "1."

In step 910, the processing system generates a single-turn in-domain training example (e.g., the single-turn in-domain training example 310a, 310b, or 310c of FIGS. 3A-3C) comprising the first question, the first target response, and the first target action recommendation. This single-turn in-domain training example may be in any suitable format.

In step 912, the processing system determines whether there are any remaining questions in the plurality of first questions. If so, as shown by the "yes" arrow, the processing system will proceed to select the next "first question" from the plurality of first questions in step 914. The steps of 904-914 will then be repeated for that newly selected "first question," and each next "first question," until the processing system determines at step 912 that there are no questions remaining in the plurality of first questions.

As shown by the "no" arrow extending from step 912, once there are no further questions remaining in the plurality of first questions, the processing system may proceed to optional step 916, or may end as shown in step 918. In optional step 916, the processing system may train an automated assistant based on a training set that includes one or more of the single-turn in-domain training examples. This training may be accomplished in any suitable way, including according to the exemplary method 1000 of FIG. 10.

In that regard, FIG. 10 sets forth an exemplary method 1000 for training an automated assistant using a set of single-turn in-domain training examples generated according to method 900 of FIG. 9, in accordance with aspects of the disclosure. In the example of FIG. 10, as well as the examples of FIGS. 11-20, the automated assistant may comprise a neural network, such as a recurrent neural network and/or a transformer network.

In step 1002, the processing system selects a given single-turn in-domain training example from a training set generated according to method 900 of FIG. 9. For simplicity, it is assumed that this training set only includes single-turn in-domain training examples. However, it will be understood that a training set may comprise any suitable mixture of different types and degrees of training examples, such as a mixture of single-turn, double-turn, and triple-turn in-domain and out-of-domain training examples. In such cases, the processing system may be configured to generate loss values according to each training example's type and degree (e.g., as described in steps 1006, 1008, 1106, 1108, 1206, 1208, 1406, 1408, 1606, 1608, 1806, 1808, 2006, and 2008 of FIGS. 10, 12, 14, 16, 18, and 20). In addition, it will be understood that the methods described herein may be used to create in-domain and out-of-domain training examples of any degree (e.g., quadruple-turn, quintuple-turn, etc.) simply by repeating the processes set forth above and below to generate further turns of questions and responses. Likewise, in some aspects of the technology, the processing system may be configured to combine two or more training examples to generate training examples with additional turns (e.g., combining two double-turn in-domain training examples to form a quadruple-turn in-domain training example, combining a single-turn out-of-domain training example with a double-turn out-of-domain training example to form a triple-turn out-of-domain training example, etc.). Further in that regard, in some aspects, the processing system may be configured to combine one or more in-domain training examples with one or more out-of-domain training examples to generate multi-turn training examples that include a mixture of in-domain and out-of-domain questions, e.g., for use in training a model how to respond when a conversation transitions into and out of a given domain.

In step 1004, the processing system uses an automated assistant to generate a first training response and a first training action recommendation based on the first question of the given single-turn in-domain training example (e.g., the copy of the initial in-domain question 304a included in the single-turn in-domain training example 310a of FIGS. 3A-3C). As discussed above, the automated assistant may be any suitable model, such as a language model with fewer parameters than the conversational language model, and/or one that is configured to run on a different type of device than the conversational language model (e.g., a mobile phone, tablet, personal computer). The automated assistant may be trained from scratch using method 900, or may have been pre-trained on basic language tasks (e.g., masked language modeling tasks, next sentence prediction tasks, etc.) and/or fine-tuned (e.g., on conversational examples and/or using information relevant to the domain in which it is intended to field questions). Likewise, in some aspects of the technology, the language model may include a learned knowledge retriever (e.g., as described in U.S. Pat. No. 11,003,865, incorporated by reference herein) configured to retrieve information (e.g., from one or more websites or remote storage systems such as websites 210, 218 and/or remote storage system 226 of FIG. 2) for use in formulating its responses.

Although in the exemplary method 1000 of FIG. 10 it is assumed that the processing system will use an automated assistant to generate both a first training response and a first training action recommendation in response to the given single turn in-domain training example, in some aspects of the technology, the processing system may instead use a model configured to generate only a first training response. For example, in some aspects of the technology, a model may be trained on a set of training examples that do not include any target action recommendations, or a set of training examples for which the first target action recommendation is always "no" or 0. In such a case, the model may be configured to only generate a first training response, and the processing system may be configured to skip step 1008 (described below) and not generate a second loss value in order to make training faster and/or less computationally intensive. Likewise, the exemplary methods 1200, 1400, 1600, 1800, and 2000 of FIGS. 12, 14, 16, 18, and 20 may be similarly modified in order to train a model to only generate responses to each given training example.

In step 1006, the processing system compares the first training response to the first target response of the given single-turn in-domain training example to generate a first loss value. This first loss value may be generated in any suitable way, using any suitable loss function. For example, in some aspects of the technology, the processing system may be configured to compare the automated assistant's first training response to the first target response using a "hard distillation" method that assesses how similar each string of text is to the other. Likewise, in some aspects, the processing system may be configured to compare the automated assistant's first training response to the first target response using a connectionist temporal classification loss ("CTC loss") or a cross-entropy loss.

In step 1008, the processing system compares the first training action recommendation to the first target action recommendation of the given single-turn in-domain training example to generate a second loss value. Here as well, this second loss value may be generated in any suitable way, using any suitable loss function (e.g., CTC loss, cross-entropy loss, etc.).

In step 1010, the processing system determines if there are further single-turn in-domain training examples in the batch. In that regard, the training set may be broken into multiple batches, or kept whole, in which case there will be one single "batch" containing every single-turn in-domain training example in the training set. In either case, as shown by the "yes" arrow, if the processing system determines that there are further single-turn in-domain training examples in the batch, it will proceed to step 1012. In step 1012, the processing system will select the next given single-turn in-domain training example from the batch, and then repeat steps 1004-1010 for that newly selected training example. This process will then be repeated for each next given single-turn in-domain training example of the batch until the processing system determines, at step 1010, that there are no further single-turn in-domain training examples in the batch, and thus proceeds to step 1014 (as shown by the "no" arrow).

As shown in step 1014, after a "first loss value" and a "second loss value" has been generated (in steps 1006 and 1008, respectively) for every single-turn in-domain training example in the batch, the processing system modifies one or more parameters of the automated assistant based at least in part on each first loss value and each second loss value. The processing system may be configured to modify the one or more parameters based on these generated first loss values and second loss values in any suitable way and at any suitable interval. For example, an optimization routine, such as stochastic gradient descent, may be applied to a loss value comprising the generated first loss values and second loss values to determine parameter modifications. Thus, in some aspects of the technology, each "batch" may include a single training example such that the processing system will conduct a back-propagation step in which it modifies the one or more parameters of the automated assistant every time a first and second loss value are generated. Likewise, where each "batch" includes two or more training examples, the processing system may be configured to combine the generated first and second loss values into an aggregate loss value (e.g., by summing or averaging the multiple first and second loss values), and modify the one or more parameters of the automated assistant based on that aggregate loss value.

In step 1016, the processing system determines if there are further batches in the training set. Where the training set has not been broken up, and there is thus one single "batch" containing every single-turn in-domain training example in the training set, the determination in step 1016 will automatically be "no," and the method 1000 will then end as shown in step 1020. However, where the training set has been broken into two or more batches, the processing system will follow the "yes" arrow to step 1018 to select the next given single-turn in-domain training example from the training set. This will then start another set of passes through steps 1004-1014 for each training example in the next batch, and the process will continue until there are no further batches remaining, at which point the processing system will follow the "no" arrow to step 1020.

Although method 1000 is shown as ending in step 1020 once all single-turn in-domain training examples of the training set have been used to tune the parameters of the automated assistant, it will be understood that method 1000 may be repeated any suitable number of times using the same training set until its first responses and first action recommendations are sufficiently close to the first target responses and first target action recommendations of each single-turn in-domain training example of the training set. In that regard, in some aspects of the technology, the processing system may be configured to aggregate all of the first loss values and all of the second loss values generated during a given pass through method 1000, and determine whether to repeat method 1000 for the training set based on that aggregate loss value. For example, in some aspects of the technology, the processing system may be configured to repeat method 1000 for the training set if the aggregate loss value for the most recent pass through method 1000 was greater than some predetermined threshold. Likewise, in some aspects, the processing system may be configured to use gradient descent to make this determination, and thus repeat method 1000 for the training set until the aggregate loss value on a given pass through method 1000 is equal to or greater than the aggregate loss value from the pass before it.

FIG. 11 sets forth an exemplary method 1100 for generating double-turn in-domain training examples, in accordance with aspects of the disclosure. In that regard, method 1100 may be used to generate double-turn in-domain training examples similar to those shown and described with respect to FIGS. 4A and 4B.

For simplicity, FIG. 11 assumes that the process will build off of the method 900 of FIG. 9. Thus, as shown in step 1102, it is assumed that steps 1104-1112 will be performed using: (1) a given first question selected according to step 902 of FIG. 9; and (2) a given first target response generated based thereon according to step 904 of FIG. 9. However, steps 1104-1112 may be performed for any suitable in-domain question and answer from any suitable source. For example, in some aspects of the technology, the given first question and given first target response may both be harvested from a chat log.

In step 1104, the processing system uses the conversational language model to generate a second question (e.g., generated second question 402b of FIGS. 4A and 4B) based on the given first target response and the given first question (e.g., Q1 and A1 of original conversation history 402a of FIGS. 4A and 4B). Here as well, the conversational language model may generate this second question in any suitable way, such as based on heuristic programming or accrued knowledge regarding how conversations generally flow, and/or specific information it has learned or retrieved regarding the "domain" of the first question and first answer.

In step 1106, the processing system uses the conversational language model to generate a second target response (e.g., generated second answer 404b of FIGS. 4A and 4B) based on the second question, the given first target response, and the given first question (e.g., Q1, A1, and Q2 of updated conversation history 404a of FIGS. 4A and 4B). Here as well, this second target response may be any suitable type of response to the second question, such as an answer, a request for further information, etc.

In step 1108, the processing system submits a second action query (e.g., first action prompt 406a and/or second action prompt 408a of FIGS. 4A and 4B) to the conversational language model in response to the second target response. Here as well, this second action query may be any suitable type of question directed to: whether any particular action would be related to the second target response, the second question, the first target response, or the first question; whether an action would make sense in view of the second target response, the second question, the first target response, or the first question; what that action would be; etc. For example, the second action query may include any of the options described above with respect to the first action query (submitted in step 906 of FIG. 9).

In step 1110, the processing system uses the conversational language model to generate a second target action recommendation (e.g., first generated action recommendation 406a and/or second generated action recommendation 408a of FIGS. 4A and 4B) based on the second action query, the second target response, the second question, the given first target response, and the given first question. Here as well, this second target action recommendation may be any suitable type of response, including any of the options described above with respect to the first target action recommendation (generated in step 908 of FIG. 9). Likewise, as described above, the second target action recommendation may be a copy of the output of the conversational language model in response to the second action query, or the processing system may generate the second target action recommendation based on the output of the conversational language model (e.g., where the conversational language model outputs a "yes" in response to the second action query, the processing system may be configured to generate a second target action recommendation of "1").

In step 1112, the processing system generates a double-turn in-domain training example (e.g., the double-turn in-domain training example 410a or 410b of FIGS. 4A, 4B) comprising the given first question, the given first target response, the second question, the second target response, and the second target action recommendation. This double-turn in-domain training example may be in any suitable format.

As will be understood, the processing system may be configured to repeat steps 1102-1112 for any suitable number of different "first questions" and their associated "first target responses" so as to create a set of double-turn in-domain training examples. Then, as shown in optional step 1114, the processing system may train an automated assistant based on a training set that includes one or more of the double-turn in-domain training examples, and optionally includes one or more of the single-turn in-domain training examples (of method 900 of FIG. 9). Here as well, this training may be accomplished in any suitable way, including according to the exemplary method 1200 of FIG. 12.

In that regard, FIG. 12 sets forth an exemplary method 1200 for training an automated assistant using a set of double-turn in-domain training examples generated according to method 1100 of FIG. 11, in accordance with aspects of the disclosure.

In step 1202, the processing system selects a given double-turn in-domain training example from a training set generated according to method 1100 of FIG. 11. Here as well, for simplicity, it is assumed that this training set only includes double-turn in-domain training examples. However, as discussed above with respect to step 1002 of FIG. 10, a training set may comprise any suitable mixture of different types and degrees of training examples, such as a mixture of single-turn, double-turn, and triple-turn in-domain and out-of-domain training examples.

In step 1204, the processing system uses an automated assistant to generate a second training response and a second training action recommendation based on the second question, the first target response, and the first question of the given double-turn in-domain training example (e.g., the information included in the double-turn in-domain training example 410a or 410b of FIGS. 4A, 4B).

In step 1206, the processing system compares the second training response to the second target response of the given double-turn in-domain training example to generate a third loss value. This third loss value may also be generated in any suitable way, using any suitable loss function (e.g., CTC loss, cross-entropy loss, etc.).

In step 1208, the processing system compares the second training action recommendation to the second target action recommendation of the given double-turn in-domain training example to generate a fourth loss value. Here as well, this fourth loss value may be generated in any suitable way, using any suitable loss function (e.g., CTC loss, cross-entropy loss, etc.).

In step 1210, the processing system determines if there are further double-turn in-domain training examples in the batch. If so, as shown by the "yes" arrow, the processing system will proceed to step 1212, where it will select the next given double-turn in-domain training example from the batch, and then repeat steps 1204-1210 for that newly selected training example. This process will then be repeated for each next given double-turn in-domain training example of the batch until the processing system determines, at step 1210, that there are no further double-turn in-domain training examples in the batch, and thus proceeds to step 1214 (as shown by the "no" arrow).

As shown in step 1214, after a "third loss value" and a "fourth loss value" has been generated (in steps 1206 and 1208, respectively) for every double-turn in-domain training example in the batch, the processing system modifies one or more parameters of the automated assistant based at least in part on each third loss value and each fourth loss value. Here as well, the processing system may be configured to modify the one or more parameters based on these generated third loss values and fourth loss values in any suitable way and at any suitable interval, including according to any of the options discussed above with respect to step 1014 of FIG. 10.

In step 1216, the processing system determines if there are further batches in the training set. Where the training set has not been broken up, and there is thus one single "batch" containing every double-turn in-domain training example in the training set, the determination in step 1216 will automatically be "no," and the method 1200 will then end as shown in step 1220. However, where the training set has been broken into two or more batches, the processing system will follow the "yes" arrow to step 1218 to select the next given double-turn in-domain training example from the training set. This will then start another set of passes through steps 1204-1214 for each training example in the next batch, and the process will continue until there are no further batches remaining, at which point the processing system will follow the "no" arrow to step 1220.

As discussed above with respect to FIG. 10, although method 1200 is shown as ending in step 1220 once all double-turn in-domain training examples of the training set have been used to tune the parameters of the automated assistant, method 1200 may also be repeated any suitable number of times using the same training set until its second responses and second action recommendations are sufficiently close to the second target responses and second target action recommendations of each double-turn in-domain training example of the training set.

FIG. 13 sets forth an exemplary method 1300 for generating triple-turn in-domain training examples, in accordance with aspects of the disclosure. In that regard, method 1300 may be used to generate triple-turn in-domain training examples similar to those shown and described with respect to FIGS. 5A and 5B.

For simplicity, FIG. 13 assumes that the process will build off of the method 1100 of FIG. 11. Thus, as shown in step 1302, it is assumed that steps 1304-1312 will be performed using: (1) a given first question selected according to step 902 of FIG. 9; (2) a given first target response generated based thereon according to step 904 of FIG. 9; (3) a given second question generated based thereon according to step 1104 of FIG. 11; and (4) a given second target response generated based thereon according to step 1106 of FIG. 11. However, steps 1304-1312 may be performed for any suitable in-domain question and answer from any suitable source. For example, in some aspects of the technology, the first question and first answer may be harvested from a chat log, and the processing system may then use the conversational language model to generate a second question and second answer (e.g., according to method 1100 of FIG. 11). Likewise, in some aspects of the technology, the first question, first answer, second question, and second answer may all be harvested from a chat log.

In step 1304, the processing system uses the conversational language model to generate a third question (e.g., generated third question 502b of FIGS. 5A and 5B) based on the given second target response, the given second question, the given first target response, and the given first question (e.g., Q1, A1, Q2, and A2 of original conversation history 502a of FIGS. 5A and 5B). Here as well, the conversational language model may generate this third question in any suitable way, such as based on heuristic programming or accrued knowledge regarding how conversations generally flow, and/or specific information it has learned or retrieved regarding the "domain" of the first question and first answer.

In step 1306, the processing system uses the conversational language model to generate a third target response (e.g., generated third answer 504*b* of FIGS. 5A and 5B) based on the third question, the given second target response, the given second question, the given first target response, and the given first question (e.g., Q1, A1, Q2, A2, and Q3 of updated conversation history 504*a* of FIGS. 5A and 5B). Here as well, this third target response may be any suitable type of response to the third question, such as an answer, a request for further information, etc.

In step 1308, the processing system submits a third action query (e.g., first action prompt 506*a* and/or second action prompt 508*a* of FIGS. 5A and 5B) to the conversational language model in response to the third target response. Here as well, this third action query may be any suitable type of question directed to: whether any particular action would be related to the third target response, the third question, the second target response, the second question, the first target response, or the first question; whether an action would make sense in view of the third target response, the third question, the second target response, the second question, the first target response, or the first question; what that action would be; etc. For example, the third action query may include any of the options described above with respect to the first action query (submitted in step 906 of FIG. 9).

In step 1310, the processing system uses the conversational language model to generate a third target action recommendation (e.g., first generated action recommendation 506*a* and/or second generated action recommendation 508*a* of FIGS. 5A and 5B) based on the third action query, the third target response, the third question, the given second target response, the given second question, the given first target response, and the given first question. Here as well, this third target action recommendation may be any suitable type of response, including any of the options described above with respect to the first target action recommendation (generated in step 908 of FIG. 9). Likewise, as described above, the third target action recommendation may be a copy of the output of the conversational language model in response to the third action query, or the processing system may generate the third target action recommendation based on the output of the conversational language model (e.g., where the conversational language model outputs a "yes" in response to the third action query, the processing system may be configured to generate a third target action recommendation of "1").

In step 1312, the processing system generates a triple-turn in-domain training example (e.g., the triple-turn in-domain training example 510*a* or 510*b* of FIGS. 5A, 5B) comprising the given first question, the given first target response, the given second question, the given second target response, the third question, the third target response, and the third target action recommendation. This triple-turn in-domain training example may also be in any suitable format.

Here as well, the processing system may be configured to repeat steps 1302-1312 for any suitable number of different double-turn inputs (of a given first question, given first target response, given second question, and given second target response) so as to create a set of triple-turn in-domain training examples. Then, as shown in optional step 1314, the processing system may train an automated assistant based on a training set that includes one or more of the triple-turn in-domain training examples, and optionally includes one or more of the double-turn in-domain training examples (of method 1100 of FIG. 11) and/or one or more of the single-turn in-domain training examples (of method 900 of FIG. 9). This training may also be accomplished in any suitable way, including according to the exemplary method 1400 of FIG. 14.

In that regard, FIG. 14 sets forth an exemplary method 1400 for training an automated assistant using a set of triple-turn in-domain training examples generated according to method 1300 of FIG. 13, in accordance with aspects of the disclosure.

In step 1402, the processing system selects a given triple-turn in-domain training example from a training set generated according to method 1300 of FIG. 13. Here as well, for simplicity, it is assumed that this training set only includes triple-turn in-domain training examples. However, as discussed above with respect to step 1002 of FIG. 10, a training set may comprise any suitable mixture of different types and degrees of training examples, such as a mixture of single-turn, double-turn, and triple-turn in-domain and out-of-domain training examples.

In step 1404, the processing system uses an automated assistant to generate a third training response and a third training action recommendation based on the third question, the second target response, the second question, the first target response, and the first question of the given triple-turn in-domain training example (e.g., the information included in the triple-turn in-domain training example 510*a* or 510*b* of FIGS. 5A, 5B).

In step 1406, the processing system compares the third training response to the third target response of the given triple-turn in-domain training example to generate a fifth loss value. This fifth loss value may also be generated in any suitable way, using any suitable loss function (e.g., CTC loss, cross-entropy loss, etc.).

In step 1408, the processing system compares the third training action recommendation to the third target action recommendation of the given triple-turn in-domain training example to generate a sixth loss value. Here as well, this sixth loss value may be generated in any suitable way, using any suitable loss function (e.g., CTC loss, cross-entropy loss, etc.).

In step 1410, the processing system determines if there are further triple-turn in-domain training examples in the batch. If so, as shown by the "yes" arrow, the processing system will proceed to step 1412, where it will select the next given triple-turn in-domain training example from the batch, and then repeat steps 1404-1410 for that newly selected training example. This process will then be repeated for each next given triple-turn in-domain training example of the batch until the processing system determines, at step 1410, that there are no further triple-turn in-domain training examples in the batch, and thus proceeds to step 1414 (as shown by the "no" arrow).

As shown in step 1414, after a "fifth loss value" and a "sixth loss value" has been generated (in steps 1406 and 1408, respectively) for every triple-turn in-domain training example in the batch, the processing system modifies one or more parameters of the automated assistant based at least in part on each fifth loss value and each sixth loss value. Here as well, the processing system may be configured to modify the one or more parameters based on these generated fifth loss values and sixth loss values in any suitable way and at any suitable interval, including according to any of the options discussed above with respect to step 1014 of FIG. 10.

In step 1416, the processing system determines if there are further batches in the training set. Where the training set has not been broken up, and there is thus one single "batch" containing every triple-turn in-domain training example in the training set, the determination in step 1416 will automatically be "no," and the method 1400 will then end as shown in step 1420. However, where the training set has been broken into two or more batches, the processing system will follow the "yes" arrow to step 1418 to select the next given triple-turn in-domain training example from the training set. This will then start another set of passes through steps 1404-1414 for each training example in the next batch, and the process will continue until there are no further batches remaining, at which point the processing system will follow the "no" arrow to step 1420.

As discussed above with respect to FIG. 10, although method 1400 is shown as ending in step 1420 once all triple-turn in-domain training examples of the training set have been used to tune the parameters of the automated assistant, method 1400 may also be repeated any suitable number of times using the same training set until its third responses and third action recommendations are sufficiently close to the third target responses and third target action recommendations of each triple-turn in-domain training example of the training set.

FIG. 15 sets forth an exemplary method 1500 for generating single-turn out-of-domain training examples, in accordance with aspects of the disclosure. In that regard, method 1500 may be used to generate single-turn out-of-domain training examples similar to that which is shown and described with respect to FIG. 6.

In step 1502, a processing system (e.g., processing system 102) selects a fourth question (e.g., initial out-of-domain question 602 of FIG. 6) of a plurality of fourth questions. As was the case with FIGS. 3A-3B, this plurality of fourth question may be derived from any suitable source(s). For example, in some aspects of the technology, the fourth question may be from a set of questions randomly harvested from queries submitted to search engines, logs of questions that were actually asked by people in online chats, etc. In addition, in some cases, the set of randomly selected questions may be further filtered to remove any questions that are identified as being unrelated to a particular topic. Thus, where the "domain" has to do with the features of a particular phone, the random set of out-of-domain questions may be filtered to remove any questions that mention the phone (or another similar phone or device), or that would generate hits on the particular phone when submitted to search engines, etc. Moreover, this filtering may be done by humans, or by heuristic or learned models configured to identify questions regarding topics related to the given domain (e.g., based on the existence of various words in a given question, an answer to a given question, search results returned in response to a given question, etc.).

In step 1504, the processing system generates a fourth target response (e.g., predetermined answer 604 of FIG. 6) that indicates that an answer to the fourth question cannot be provided. This fourth target response may be any suitable type of response that indicates that an answer to the fourth question cannot or will not be provided, such as "I don't know," "I cannot answer that," or an indicator or tag such as "0" or "<UNK>."

In step 1506, the processing system generates a fourth target action recommendation (e.g., predetermined action recommendation 606 of FIG. 6) that indicates that no action is to be taken. This fourth target action recommendation may be any suitable response that indicates that no action is to be taken in response to the fourth question, such as "no," "none," "<NULL>," etc.

In step 1508, the processing system generates a single-turn out-of-domain training example (e.g., the single-turn out-of-domain training example 608 of FIG. 6) comprising the fourth question, the fourth target response, and the fourth target action recommendation. This single-turn out-of-domain training example may be in any suitable format.

In step 1510, the processing system determines whether there are any remaining questions in the plurality of fourth questions. If so, as shown by the "yes" arrow, the processing system will proceed to select the next "fourth question" from the plurality of fourth questions in step 1512. The steps of 1504-1512 will then be repeated for that newly selected "fourth question," and each next "fourth question," until the processing system determines at step 1510 that there are no questions remaining in the plurality of fourth questions.

As shown by the "no" arrow extending from step 1510, once there are no further questions remaining in the plurality of fourth questions, the processing system may proceed to optional step 1514, or may end as shown in step 1516. In optional step 1514, the processing system may train an automated assistant based on a training set that includes one or more of the single-turn out-of-domain training examples. This training may be accomplished in any suitable way, including according to the exemplary method 1600 of FIG. 16.

In that regard, FIG. 16 sets forth an exemplary method 1600 for training an automated assistant using a set of single-turn out-of-domain training examples generated according to method 1500 of FIG. 15, in accordance with aspects of the disclosure.

In step 1602, the processing system selects a given single-turn out-of-domain training example from a training set generated according to method 1500 of FIG. 15. Here as well, for simplicity, it is assumed that this training set only includes single-turn out-of-domain training examples. However, as discussed above with respect to step 1002 of FIG. 10, a training set may comprise any suitable mixture of different types and degrees of training examples, such as a mixture of single-turn, double-turn, and triple-turn in-domain and out-of-domain training examples.

In step 1604, the processing system uses an automated assistant to generate a fourth training response and a fourth training action recommendation based on the fourth question of the given single-turn out-of-domain training example (e.g., the information included in the single-turn out-of-domain training example 608 of FIG. 6).

In step 1606, the processing system compares the fourth training response to the fourth target response of the given single-turn out-of-domain training example to generate a seventh loss value. This seventh loss value may also be generated in any suitable way, using any suitable loss function (e.g., CTC loss, cross-entropy loss, etc.).

In step 1608, the processing system compares the fourth training action recommendation to the fourth target action recommendation of the given single-turn out-of-domain training example to generate an eighth loss value. Here as well, this eighth loss value may be generated in any suitable way, using any suitable loss function (e.g., CTC loss, cross-entropy loss, etc.).

In step 1610, the processing system determines if there are further single-turn out-of-domain training examples in the batch. If so, as shown by the "yes" arrow, the processing system will proceed to step 1612, where it will select the next given single-turn out-of-domain training example from the batch, and then repeat steps 1604-1610 for that newly selected training example. This process will then be repeated for each next given single-turn out-of-domain training example of the batch until the processing system determines, at step 1610, that there are no further single-turn out-of-domain training examples in the batch, and thus proceeds to step 1614 (as shown by the "no" arrow).

As shown in step 1614, after a "seventh loss value" and an "eighth loss value" has been generated (in steps 1606 and 1608, respectively) for every single-turn out-of-domain training example in the batch, the processing system modifies one or more parameters of the automated assistant based at least in part on each seventh loss value and each eighth loss value. Here as well, the processing system may be configured to modify the one or more parameters based on these generated seventh loss values and eighth loss values in any suitable way and at any suitable interval, including according to any of the options discussed above with respect to step 1014 of FIG. 10.

In step 1616, the processing system determines if there are further batches in the training set. Where the training set has not been broken up, and there is thus one single "batch" containing every single-turn out-of-domain training example in the training set, the determination in step 1616 will automatically be "no," and the method 1600 will then end as shown in step 1620. However, where the training set has been broken into two or more batches, the processing system will follow the "yes" arrow to step 1618 to select the next given single-turn out-of-domain training example from the training set. This will then start another set of passes through steps 1604-1614 for each training example in the next batch, and the process will continue until there are no further batches remaining, at which point the processing system will follow the "no" arrow to step 1620.

As discussed above with respect to FIG. 10, although method 1600 is shown as ending in step 1620 once all single-turn out-of-domain training examples of the training set have been used to tune the parameters of the automated assistant, method 1600 may also be repeated any suitable number of times using the same training set until its fourth responses and fourth action recommendations are sufficiently close to the fourth target responses and fourth target action recommendations of each single-turn out-of-domain training example of the training set.

FIG. 17 sets forth an exemplary method 1700 for generating double-turn out-of-domain training examples, in accordance with aspects of the disclosure. In that regard, method 1700 may be used to generate double-turn out-of-domain training examples similar to that which is shown and described with respect to FIG. 7.

For simplicity, FIG. 17 assumes that the process will build off of the method 1500 of FIG. 15. Thus, as shown in step 1702, it is assumed that steps 1704-1710 will be performed using: (1) a given fourth question selected according to step 1502 of FIG. 15; and (2) a given fourth target response generated based thereon according to step 1504 of FIG. 15. However, steps 1704-1710 may be performed for any suitable out-of-domain question from any suitable source. For example, in some aspects of the technology, the given fourth question may be harvested from a chat log, and the given fourth target response may be any suitable predetermined response.

In step 1704, the processing system uses the conversational language model to generate a fifth question (e.g., generated second question 702b of FIG. 7) based on the given fourth target response and the given fourth question (e.g., Q1 and A1 of conversation history 702a of FIG. 7). Here as well, the conversational language model may generate this fifth question in any suitable way, such as based on heuristic programming or accrued knowledge regarding how conversations generally flow, and/or specific information it has learned or retrieved regarding the subject of the first question and first answer.

In step 1706, the processing system generates a fifth target response (e.g., predetermined second answer 704 of FIG. 7) that indicates that an answer to the fifth question cannot be provided. Here as well, this fifth target response may be any suitable type of response that indicates that an answer to the fifth question cannot or will not be provided, such as "I don't know," "I cannot answer that," or an indicator or tag such as "0" or "<UNK>."

In step 1708, the processing system generates a fifth target action recommendation (e.g., predetermined second action recommendation 706 of FIG. 7) that indicates that no action is to be taken. As above, this fifth target action recommendation may be any suitable response that indicates that no action is to be taken in response to the fifth question, such as "no," "none," "<NULL>," etc.

In step 1710, the processing system generates a double-turn out-of-domain training example (e.g., the double-turn out-of-domain training example 708 of FIG. 7) comprising the given fourth question, the given fourth target response, the fifth question, the fifth target response, and the fifth target action recommendation. This double-turn out-of-domain training example may be in any suitable format.

As will be understood, the processing system may be configured to repeat steps 1702-1710 for any suitable number of different "fourth questions" and their associated "fourth target responses" so as to create a set of double-turn out-of-domain training examples. Then, as shown in optional step 1712, the processing system may train an automated assistant based on a training set that includes one or more of the double-turn out-of-domain training examples, and optionally includes one or more of the single-turn out-of-domain training examples (of method 1500 of FIG. 15). Here as well, this training may be accomplished in any suitable way, including according to the exemplary method 1800 of FIG. 18.

In that regard, FIG. 18 sets forth an exemplary method 1800 for training an automated assistant using a set of double-turn out-of-domain training examples generated according to method 1700 of FIG. 17, in accordance with aspects of the disclosure.

In step 1802, the processing system selects a given double-turn out-of-domain training example from a training set generated according to method 1700 of FIG. 17. Here as well, for simplicity, it is assumed that this training set only includes double-turn out-of-domain training examples. However, as discussed above with respect to step 1002 of FIG. 10, a training set may comprise any suitable mixture of different types and degrees of training examples, such as a mixture of single-turn, double-turn, and triple-turn in-domain and out-of-domain training examples.

In step 1804, the processing system uses an automated assistant to generate a fifth training response and a fifth training action recommendation based on the fifth question, the fourth target response, and the fourth question of the given double-turn out-of-domain training example (e.g., the information included in the double-turn out-of-domain training example 708 of FIG. 7).

In step 1806, the processing system compares the fifth training response to the fifth target response of the given double-turn out-of-domain training example to generate a ninth loss value. This ninth loss value may also be generated in any suitable way, using any suitable loss function (e.g., CTC loss, cross-entropy loss, etc.).

In step 1808, the processing system compares the fifth training action recommendation to the fifth target action recommendation of the given double-turn out-of-domain training example to generate an tenth loss value. Here as well, this tenth loss value may be generated in any suitable way, using any suitable loss function (e.g., CTC loss, cross-entropy loss, etc.).

In step 1810, the processing system determines if there are further double-turn out-of-domain training examples in the batch. If so, as shown by the "yes" arrow, the processing system will proceed to step 1812, where it will select the next given double-turn out-of-domain training example from the batch, and then repeat steps 1804-1810 for that newly selected training example. This process will then be repeated for each next given double-turn out-of-domain training example of the batch until the processing system determines, at step 1810, that there are no further double-turn out-of-domain training examples in the batch, and thus proceeds to step 1814 (as shown by the "no" arrow).

As shown in step 1814, after a "ninth loss value" and a "tenth loss value" has been generated (in steps 1806 and 1808, respectively) for every double-turn out-of-domain training example in the batch, the processing system modifies one or more parameters of the automated assistant based at least in part on each ninth loss value and each tenth loss value. Here as well, the processing system may be configured to modify the one or more parameters based on these generated ninth loss values and tenth loss values in any suitable way and at any suitable interval, including according to any of the options discussed above with respect to step 1014 of FIG. 10.

In step 1816, the processing system determines if there are further batches in the training set. Where the training set has not been broken up, and there is thus one single "batch" containing every double-turn out-of-domain training example in the training set, the determination in step 1816 will automatically be "no," and the method 1800 will then end as shown in step 1820. However, where the training set has been broken into two or more batches, the processing system will follow the "yes" arrow to step 1818 to select the next given double-turn out-of-domain training example from the training set. This will then start another set of passes through steps 1804-1814 for each training example in the next batch, and the process will continue until there are no further batches remaining, at which point the processing system will follow the "no" arrow to step 1820.

As discussed above with respect to FIG. 10, although method 1800 is shown as ending in step 1820 once all double-turn out-of-domain training examples of the training set have been used to tune the parameters of the automated assistant, method 1800 may also be repeated any suitable number of times using the same training set until its fifth responses and fifth action recommendations are sufficiently close to the fifth target responses and fifth target action recommendations of each double-turn out-of-domain training example of the training set.

FIG. 19 sets forth an exemplary method 1900 for generating triple-turn out-of-domain training examples, in accordance with aspects of the disclosure. In that regard, method 1900 may be used to generate triple-turn out-of-domain training examples similar to that which is shown and described with respect to FIG. 8.

For simplicity, FIG. 19 assumes that the process will build off of the method 1700 of FIG. 17. Thus, as shown in step 1902, it is assumed that steps 1904-1910 will be performed using: (1) a given fourth question selected according to step 1502 of FIG. 15; (2) a given fourth target response generated based thereon according to step 1504 of FIG. 15; (3) a given fifth question generated based thereon according to step 1704 of FIG. 17; and (4) a given fifth target response generated based thereon according to step 1706 of FIG. 17.

However, steps 1904-1910 may be performed for any suitable out-of-domain question or pair of questions from any suitable source. For example, in some aspects of the technology, the given fourth question may be harvested from a chat log, the given fourth target response may be any suitable predetermined response, the processing system may use the conversational language model to generate the given fifth question (e.g., according to method 1700 of FIG. 17), and the given fifth target response may likewise be any suitable predetermined response. Likewise, in some aspects of the technology, the given fourth question and given fifth question may both be harvested from a chat log, and the given fourth target response and the given fifth target response may be any suitable predetermined responses.

In step 1904, the processing system uses the conversational language model to generate a sixth question (e.g., generated third question 802b of FIG. 8) based on the given fifth target response, the given fifth question, the given fourth target response, and the given fourth question (e.g., Q1, A1, Q2, and A2 of conversation history 802a of FIG. 8). Here as well, the conversational language model may generate this sixth question in any suitable way, such as based on heuristic programming or accrued knowledge regarding how conversations generally flow, and/or specific information it has learned or retrieved regarding the subject of the first question and first answer.

In step 1906, the processing system generates a sixth target response (e.g., predetermined third answer 804 of FIG. 8) that indicates that an answer to the sixth question cannot be provided. Here as well, this sixth target response may be any suitable type of response that indicates that an answer to the sixth question cannot or will not be provided, such as "I don't know," "I cannot answer that," or an indicator or tag such as "0" or "<UNK>."

In step 1908, the processing system generates a sixth target action recommendation (e.g., predetermined third action recommendation 806 of FIG. 8) that indicates that no action is to be taken. As above, this sixth target action recommendation may be any suitable response that indicates that no action is to be taken in response to the sixth question, such as "no," "none," "<NULL>," etc.

In step 1910, the processing system generates a triple-turn out-of-domain training example (e.g., the triple-turn out-of-domain training example 808 of FIG. 8) comprising the given fourth question, the given fourth target response, the given fifth question, the given fifth target response, the sixth question, the sixth target response, and the sixth target action recommendation. This triple-turn out-of-domain training example may be in any suitable format.

Here as well, the processing system may be configured to repeat steps 1902-1910 for any suitable number of different double-turn inputs (of a given fourth question, given fourth target response, given fifth question, and given fifth target response) so as to create a set of triple-turn out-of-domain training examples. Then, as shown in optional step 1912, the processing system may train an automated assistant based on a training set that includes one or more of the triple-turn out-of-domain training examples, and optionally includes one or more of the double-turn out-of-domain training examples (of method 1700 of FIG. 17) and/or one or more of the single-turn out-of-domain training examples (of method 1500 of FIG. 15). This training may also be accomplished in any suitable way, including according to the exemplary method 2000 of FIG. 20.

Figure 20:
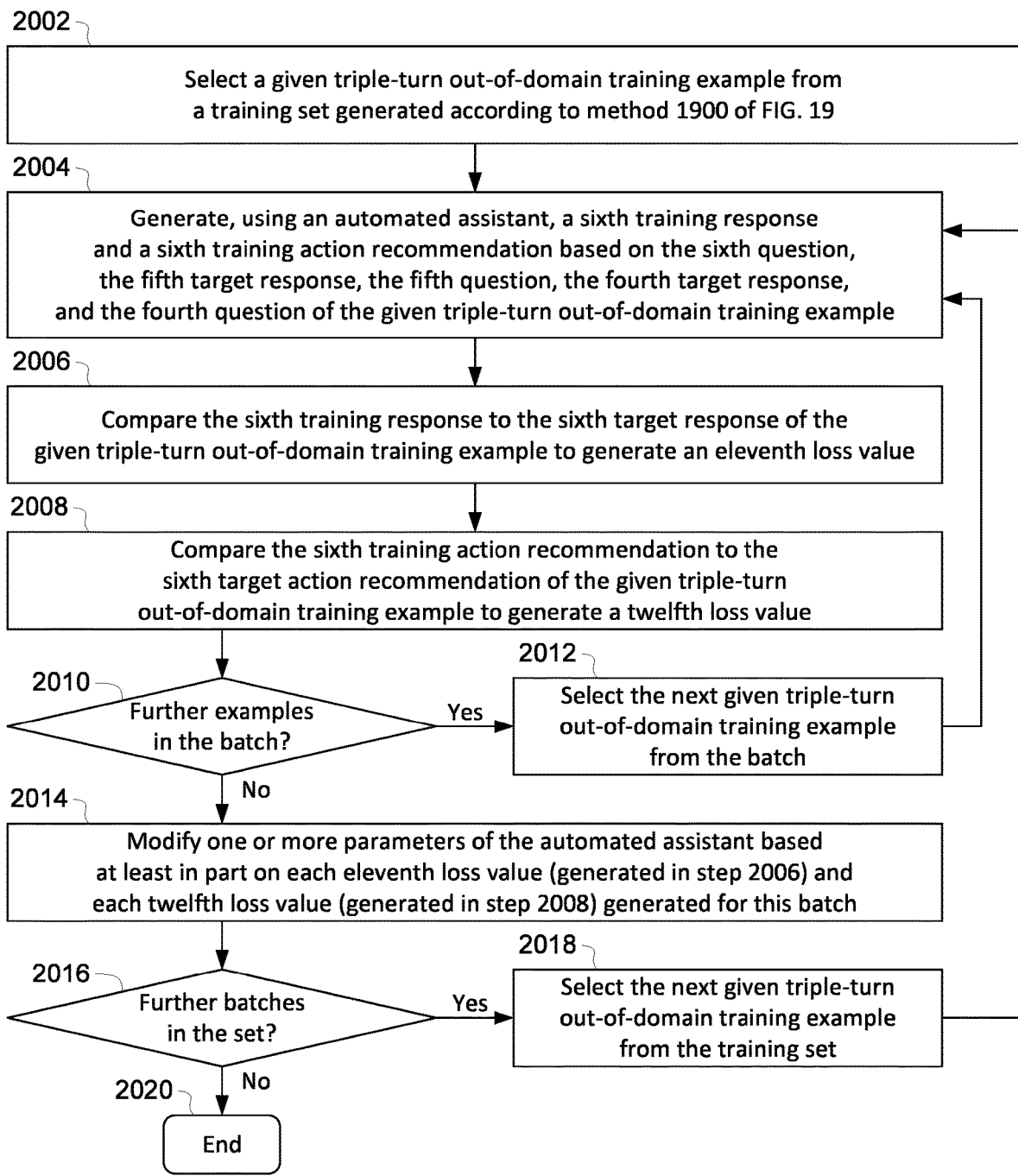
FIG. 20 sets forth an exemplary method for training an automated assistant using a set of triple-turn out-of-domain training examples generated according to the method of FIG. 19, in accordance with aspects of the disclosure.

In that regard, FIG. 20 sets forth an exemplary method 2000 for training an automated assistant using a set of triple-turn out-of-domain training examples generated according to method 1900 of FIG. 19, in accordance with aspects of the disclosure.

In step 2002, the processing system selects a given triple-turn out-of-domain training example from a training set generated according to method 1900 of FIG. 19. Here as well, for simplicity, it is assumed that this training set only includes triple-turn out-of-domain training examples. However, as discussed above with respect to step 1002 of FIG. 10, a training set may comprise any suitable mixture of different types and degrees of training examples, such as a mixture of single-turn, double-turn, and triple-turn in-domain and out-of-domain training examples.

In step 2004, the processing system uses an automated assistant to generate a sixth training response and a sixth training action recommendation based on the based on the sixth question, the fifth target response, the fifth question, the fourth target response, and the fourth question of the given triple-turn out-of-domain training example (e.g., the information included in the triple-turn out-of-domain training example 808 of FIG. 8).

In step 2006, the processing system compares the sixth training response to the sixth target response of the given triple-turn out-of-domain training example to generate an eleventh loss value. This eleventh loss value may also be generated in any suitable way, using any suitable loss function (e.g., CTC loss, cross-entropy loss, etc.).

In step 2008, the processing system compares the sixth training action recommendation to the sixth target action recommendation of the given triple-turn out-of-domain training example to generate a twelfth loss value. Here as well, this twelfth loss value may be generated in any suitable way, using any suitable loss function (e.g., CTC loss, cross-entropy loss, etc.).

In step 2010, the processing system determines if there are further triple-turn out-of-domain training examples in the batch. If so, as shown by the "yes" arrow, the processing system will proceed to step 2012, where it will select the next given triple-turn out-of-domain training example from the batch, and then repeat steps 2004-2010 for that newly selected training example. This process will then be repeated for each next given triple-turn out-of-domain training example of the batch until the processing system determines, at step 2010, that there are no further triple-turn out-of-domain training examples in the batch, and thus proceeds to step 2014 (as shown by the "no" arrow).

As shown in step 2014, after an "eleventh loss value" and a "twelfth loss value" has been generated (in steps 2006 and 2008, respectively) for every triple-turn out-of-domain training example in the batch, the processing system modifies one or more parameters of the automated assistant based at least in part on each eleventh loss value and each twelfth loss value. Here as well, the processing system may be configured to modify the one or more parameters based on these generated eleventh loss values and twelfth loss values in any suitable way and at any suitable interval, including according to any of the options discussed above with respect to step 1014 of FIG. 10.

In step 2016, the processing system determines if there are further batches in the training set. Where the training set has not been broken up, and there is thus one single "batch" containing every triple-turn out-of-domain training example in the training set, the determination in step 2016 will automatically be "no," and the method 2000 will then end as shown in step 2020. However, where the training set has been broken into two or more batches, the processing system will follow the "yes" arrow to step 2018 to select the next given triple-turn out-of-domain training example from the training set. This will then start another set of passes through steps 2004-2014 for each training example in the next batch, and the process will continue until there are no further batches remaining, at which point the processing system will follow the "no" arrow to step 2020.

As discussed above with respect to FIG. 10, although method 2000 is shown as ending in step 2020 once all triple-turn out-of-domain training examples of the training set have been used to tune the parameters of the automated assistant, method 2000 may also be repeated any suitable number of times using the same training set until its sixth responses and sixth action recommendations are sufficiently close to the sixth target responses and sixth target action recommendations of each triple-turn out-of-domain training example of the training set.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A computer-implemented method, comprising:
for each first question of a plurality of first questions:
generating, using a conversational language model, a first target response based on the first question;
submitting, using one or more processors of a processing system, a first action query to the conversational language model in response to the first target response;
generating, using the conversational language model, a first target action recommendation based on the first action query, the first target response, and the first question;
generating, using the one or more processors, a single-turn in-domain training example comprising the first question, the first target response, and the first target action recommendation;
generating, using the conversational language model, a second question based on the first target response and the first question;
generating, using the conversational language model, a second target response based on the second question, the first target response, and the first question;
submitting, using the one or more processors, a second action query to the conversational language model in response to the second target response;
generating, using the conversational language model, a second target action recommendation based on the second action query, the second target response, the second question, the first target response, and the first question; and
generating, using the one or more processors, a double-turn in-domain training example comprising the first question, the first target response, the second question, the second target response, and the second target action recommendation; and training an automated assistant, using the one or more processors, based on a training set, wherein the training set includes one or more of the single-turn in-domain training examples, and one or more of the double-turn in-domain training examples.

2. The method of claim 1, wherein training the automated assistant based on the training set comprises:

for each given single-turn in-domain training example in the training set:

generating, using the automated assistant, a first training response and a first training action recommendation based on the first question of the given single-turn in-domain training example;

comparing, using the one or more processors, the first training response to the first target response of the given single-turn in-domain training example to generate a first loss value; and comparing, using the one or more processors, the first training action recommendation to the first target action recommendation of the given single-turn in-domain training example to generate a second loss value; and modifying, using the one or more processors, one or more parameters of the automated assistant based at least in part on the generated first loss values and the generated second loss values.

3. The method of claim 2, wherein the first target action recommendation and the first training action recommendation both comprise one or more of: an indication of whether to take an action; an identification of an action to be taken; or instructions that, when executed by one or more processors of a given device, cause the given device to take an action.

4. The method of claim 2, wherein training the automated assistant based on the training set further comprises:

for each given double-turn in-domain training example in the training set:

generating, using the automated assistant, a second training response and a second training action recommendation based on the second question, the first target response, and the first question of the given double-turn in-domain training example;

comparing, using the one or more processors, the second training response to the second target response of the given double-turn in-domain training example to generate a third loss value; and comparing, using the one or more processors, the second training action recommendation to the second target action recommendation of the given double-turn in-domain training example to generate a fourth loss value; and modifying, using the one or more processors, one or more parameters of the automated assistant based at least in part on the generated third loss values and the generated fourth loss values.

5. The method of claim 4, wherein the second target action recommendation and the second training action recommendation both comprise one or more of:

an indication of whether to take an action;

an identification of an action to be taken; or instructions that, when executed by one or more processors of a given device, cause the given device to take an action.

6. The method of claim 4, further comprising:

for each first question of a plurality of first questions:

generating, using the conversational language model, a third question based on the second target response, the second question, the first target response, and the first question;

generating, using the conversational language model, a third target response based on the third question, the second target response, the second question, the first target response, and the first question;

submitting, using the one or more processors, a third action query to the conversational language model in response to the third target response;

generating, using the conversational language model, a third target action recommendation based on the third action query, the third target response, the third question, the second target response, the second question, the first target response, and the first question; and generating, using the one or more processors, a triple-turn in-domain training example comprising the first question, the first target response, the second question, the second target response, the third question, the third target response, and the third target action recommendation; and wherein the training set further includes one or more of the triple-turn in-domain training examples.

7. The method of claim 6, wherein training the automated assistant based on the training set further comprises:

for each given triple-turn in-domain training example in the training set:

generating, using the automated assistant, a third training response and a third training action recommendation based on the third question, the second target response, the second question, the first target response, and the first question of the given triple-turn in-domain training example;

comparing, using the one or more processors, the third training response to the third target response of the given triple-turn in-domain training example to generate a fifth loss value; and comparing, using the one or more processors, the third training action recommendation to the third target action recommendation of the given triple-turn in-domain training example to generate a sixth loss value; and modifying, using the one or more processors, one or more parameters of the automated assistant based at least in part on the generated fifth loss values and the generated sixth loss values.

8. The method of claim 7, wherein the third target action recommendation and the third training action recommendation both comprise one or more of: an indication of whether to take an action; an identification of an action to be taken; or instructions that, when executed by one or more processors of a given device, cause the given device to take an action.

9. The method of claim 7, further comprising:

for each fourth question of a plurality of fourth questions:

generating, using the one or more processors, a single-turn out-of-domain training example comprising the fourth question, a fourth target response, and a fourth target action recommendation, wherein the fourth target response indicates that an answer to the fourth question cannot be provided, and wherein the fourth target action recommendation indicates that no action is to be taken;

generating, using the conversational language model, a fifth question based on the fourth target response and the fourth question; and generating, using the one or more processors, a double-turn out-of-domain training example comprising the fourth question, the fourth target response, the fifth question, a fifth target response, and a fifth target action recommendation, wherein the fifth target response indicates that an answer to the fifth question cannot be provided, and wherein the fifth target action recommendation indicates that no action is to be taken; and wherein the training set further includes one or more of the single-turn out-of-domain training examples, and one or more of the double-turn out-of-domain training examples.

10. The method of claim 9, wherein training the automated assistant based on the training set further comprises:

for each given single-turn out-of-domain training example in the training set:

generating, using the automated assistant, a fourth training response and a fourth training action recommendation based on the fourth question of the given single-turn out-of-domain training example;

comparing, using the one or more processors, the fourth training response to the fourth target response of the given single-turn out-of-domain training example to generate a seventh loss value; and comparing, using the one or more processors, the fourth training action recommendation to the fourth target action recommendation of the given single-turn out-of-domain training example to generate an eighth loss value; and modifying, using the one or more processors, one or more parameters of the automated assistant based at least in part on the generated seventh loss values and the generated eighth loss values.

11. The method of claim 10, wherein training the automated assistant based on the training set further comprises:

for each given double-turn out-of-domain training example in the training set:

generating, using the automated assistant, a fifth training response and a fifth training action recommendation based on the fifth question, the fourth target response, and the fourth question of the given double-turn out-of-domain training example;

comparing, using the one or more processors, the fifth training response to the fifth target response of the given double-turn out-of-domain training example to generate a ninth loss value; and comparing, using the one or more processors, the fifth training action recommendation to the fifth target action recommendation of the given double-turn out-of-domain training example to generate a tenth loss value; and modifying, using the one or more processors, one or more parameters of the automated assistant based at least in part on the generated ninth loss values and the generated tenth loss values.

12. The method of claim 11, further comprising:

for each fourth question of a plurality of fourth questions:

generating, using the conversational language model, a sixth question based on the fifth target response, the fifth question, the fourth target response, and the fourth question; and generating, using the one or more processors, a triple-turn out-of-domain training example comprising the fourth question, the fourth target response, the fifth question, the fifth target response, the sixth question, a sixth target response, and a sixth target action recommendation, wherein the sixth target response indicates that an answer to the sixth question cannot be provided, and wherein the sixth target action recommendation indicates that no action is to be taken; and wherein the training set further includes one or more of the triple-turn out-of-domain training examples.

13. The method of claim 12, wherein training the automated assistant based on the training set further comprises:

for each given triple-turn out-of-domain training example in the training set:

generating, using the automated assistant, a sixth training response and a sixth training action recommendation based on the sixth question, the fifth target response, the fifth question, the fourth target response, and the fourth question of the given triple-turn out-of-domain training example;

comparing, using the one or more processors, the sixth training response to the sixth target response of the given triple-turn out-of-domain training example to generate an eleventh loss value; and comparing, using the one or more processors, the sixth training action recommendation to the sixth target action recommendation of the given triple-turn out-of-domain training example to generate a twelfth loss value; and modifying, using the one or more processors, one or more parameters of the automated assistant based at least in part on the generated eleventh loss values and the generated twelfth loss values.

14. The method of claim 13, further comprising:

generating, using the one or more processors, one or more of the plurality of first questions based on one or more logs of questions asked by human users relating to a given device.

15. The method of claim 14, further comprising:

generating, using the one or more processors, one or more of the plurality of fourth questions based on one or more logs of questions asked by human users not relating to the given device.

16. The method of claim 14, wherein training the automated assistant based on the training set results in the automated assistant being configured to provide information about the given device.

17. The method of claim 13, further comprising:

generating, using the one or more processors, one or more of the plurality of first questions based on one or more queries that, when submitted to a given search engine, cause the search engine to return one or more webpages that mention a given device.

18. The method of claim 17, further comprising:

generating, using the one or more processors, one or more of the plurality of fourth questions based on one or more queries that, when submitted to a given search engine, cause the search engine to return one or more webpages that do not mention the given device.

19. The method of claim 17, wherein training the automated assistant based on the training set results in the automated assistant being configured to provide information about the given device.

20. A processing system comprising one or more processors configured to carry out the method of claim 1.

21. A non-transitory computer-readable medium storing computer readable instructions that, when executed by a computer, cause the computer to perform the method of claim 1.

22. An automated assistant device comprising processing circuitry trained according to the method of claim 1.

23. The automated assistant device of claim 22, wherein the processing circuitry is configured to obtain information from a first device in order to generate responses to questions, the first device being remote from the automated assistant device.

* * * * *